United States Patent
Regan et al.

(10) Patent No.: US 11,166,350 B2
(45) Date of Patent: Nov. 2, 2021

(54) ADJUSTABLE CONVEYANCE CURING SYSTEM

(71) Applicant: NIKE, Inc., Beaverton, OR (US)

(72) Inventors: Patrick Conall Regan, Taichung (TW); Hyung Lim, Busan (KR); DongWoo Lee, Busan (KR); JaePil Kang, Busan (KR); ChoulSoo Jeong, Busan (KR)

(73) Assignee: NIKE, Inc., Beaverton, OR (US)

( * ) Notice: Subject to any disclaimer, the term of this patent is extended or adjusted under 35 U.S.C. 154(b) by 143 days.

(21) Appl. No.: 16/385,141

(22) Filed: Apr. 16, 2019

(65) Prior Publication Data
US 2019/0246461 A1     Aug. 8, 2019

Related U.S. Application Data

(62) Division of application No. 14/158,420, filed on Jan. 17, 2014, now Pat. No. 10,321,524.

(51) Int. Cl.
*H05B 6/02*     (2006.01)
*H05B 6/10*     (2006.01)
(Continued)

(52) U.S. Cl.
CPC .............. *H05B 6/44* (2013.01); *A43B 13/187* (2013.01); *B29D 35/122* (2013.01); *H05B 6/101* (2013.01); *H05B 6/107* (2013.01); *H05B 6/40* (2013.01)

(58) Field of Classification Search
CPC ........ H05B 6/105; H05B 6/101; B29C 33/06; C21D 1/42
See application file for complete search history.

(56) References Cited

U.S. PATENT DOCUMENTS

| 3,715,556 A | 2/1973 | Balzer et al. |
| 3,961,150 A | 6/1976 | Lewis et al. |

(Continued)

FOREIGN PATENT DOCUMENTS

| BE | 723044 A | 4/1969 |
| CN | 2362678 Y | 2/2000 |

(Continued)

OTHER PUBLICATIONS

European Communication dated Nov. 21, 2019 in European Application No. 15704874.5, 4 pages.
(Continued)

*Primary Examiner* — Robert J Utama
*Assistant Examiner* — Lawrence H Samuels
(74) *Attorney, Agent, or Firm* — Shook, Hardy & Bacon LLP

(57) ABSTRACT

Adjustable system and methods are provided that are used in curing a foam item. Induction heating assemblies, cooling mechanisms and a dynamic conveyance mechanism may be used in combination to heat and cool a mold containing the foam item as it is conveyed. The dynamic conveyance mechanism may have removable rollers that allow for chambers, such as the induction heating assemblies, to be placed into areas where removable rollers have been removed. As such, chambers may be placed into, taken out of, and moved around the dynamic conveyance mechanism. The flexibility of a dynamic conveyance mechanism allows for a curing process to be automated, adjusted, and customized.

6 Claims, 16 Drawing Sheets

(51) Int. Cl.
  *C21D 1/42* (2006.01)
  *B29C 49/42* (2006.01)
  *H05B 6/44* (2006.01)
  *B29D 35/12* (2010.01)
  *A43B 13/18* (2006.01)
  *H05B 6/40* (2006.01)

(56) References Cited

U.S. PATENT DOCUMENTS

| | | | |
|---|---|---|---|
| 4,017,703 A | 4/1977 | Lavins, Jr. et al. | |
| 4,039,794 A * | 8/1977 | Kasper | H05B 6/105 219/618 |
| 4,048,275 A | 9/1977 | Usamoto et al. | |
| 4,112,285 A | 9/1978 | Pan et al. | |
| 4,265,922 A | 5/1981 | Tsuchiya et al. | |
| 4,317,978 A | 3/1982 | Nebesar | |
| 4,420,667 A | 12/1983 | Lewis | |
| 4,577,081 A | 3/1986 | Balzer | |
| 5,157,232 A | 10/1992 | Pfaffmann | |
| 5,249,255 A | 9/1993 | Fuqua et al. | |
| 5,461,770 A | 10/1995 | Kimura et al. | |
| 5,479,436 A | 12/1995 | Hashida et al. | |
| 5,487,795 A | 1/1996 | Kim et al. | |
| 5,505,599 A * | 4/1996 | Kemerer | B29C 48/001 425/4 C |
| 5,505,813 A * | 4/1996 | Scheifele | B29C 53/50 156/380.1 |
| 5,510,600 A | 4/1996 | Jackson | |
| 5,542,165 A * | 8/1996 | Coassin | B21B 1/466 29/33 C |
| 5,700,495 A * | 12/1997 | Kemerer | B29C 35/16 425/190 |
| 5,923,699 A | 7/1999 | Swanger | |
| 6,121,592 A | 9/2000 | Fishman et al. | |
| 6,177,662 B1 * | 1/2001 | Rutledge | H05B 6/107 219/652 |
| 6,180,933 B1 | 1/2001 | Demidovitch et al. | |
| 6,259,071 B1 | 7/2001 | Demidovitch et al. | |
| 6,319,877 B1 | 11/2001 | Christensen et al. | |
| 6,770,858 B2 | 8/2004 | Schluckebier | |
| 6,799,712 B1 | 10/2004 | Austen et al. | |
| 6,811,396 B2 * | 11/2004 | Sudau | C21D 9/0081 432/121 |
| 6,946,629 B2 | 9/2005 | Miyahara et al. | |
| 7,789,660 B2 | 9/2010 | Tenzek et al. | |
| 7,989,736 B2 | 8/2011 | Park et al. | |
| 9,883,551 B2 * | 1/2018 | Widitora | H05B 6/107 |
| 2001/0001465 A1 | 5/2001 | Inoh et al. | |
| 2001/0030184 A1 | 10/2001 | Richert et al. | |
| 2002/0148829 A1 | 10/2002 | Fishman | |
| 2004/0016478 A1 | 1/2004 | Sharpe et al. | |
| 2004/0016744 A1 | 1/2004 | Ottaway | |
| 2004/0047941 A1 * | 3/2004 | Salenbien | B29C 49/6409 425/526 |
| 2004/0096299 A1 * | 5/2004 | Sudau | B21B 39/14 414/147 |
| 2007/0063385 A1 | 3/2007 | Carsley et al. | |
| 2007/0246459 A1 | 10/2007 | Loveless et al. | |
| 2008/0136066 A1 | 6/2008 | Taylor et al. | |
| 2008/0267251 A1 | 10/2008 | Gerszewski et al. | |
| 2009/0115104 A1 | 5/2009 | Anbarasu et al. | |
| 2009/0127254 A1 | 5/2009 | Bamberg et al. | |
| 2009/0197215 A1 | 8/2009 | Balduin et al. | |
| 2010/0065552 A1 | 3/2010 | Matsen et al. | |
| 2010/0086002 A1 * | 4/2010 | Hwang | F27B 9/2407 373/7 |
| 2010/0108665 A1 | 5/2010 | Hirota | |
| 2010/0178627 A1 | 7/2010 | Dover et al. | |
| 2011/0132898 A1 | 6/2011 | Moratalla Martnez et al. | |
| 2011/0220249 A1 * | 9/2011 | Bogicevic | C21D 1/04 148/108 |
| 2011/0248026 A1 | 10/2011 | Schroder et al. | |
| 2012/0216573 A1 | 8/2012 | Dannoux et al. | |
| 2012/0318461 A1 * | 12/2012 | Jung | B29C 70/506 156/437 |
| 2013/0312478 A1 * | 11/2013 | Kobayashi | B21D 22/022 72/342.6 |
| 2014/0263286 A1 * | 9/2014 | Widitora | H05B 6/107 219/621 |
| 2014/0263287 A1 * | 9/2014 | Widitora | H05B 6/06 219/627 |
| 2015/0202830 A1 | 7/2015 | Regan et al. | |
| 2016/0067807 A1 | 3/2016 | Henderkott et al. | |

FOREIGN PATENT DOCUMENTS

| | | |
|---|---|---|
| CN | 1485192 A | 3/2004 |
| CN | 101448750 A | 6/2009 |
| CN | 101941542 A | 1/2011 |
| CN | 102091709 A | 6/2011 |
| CN | 102320116 A | 1/2012 |
| CN | 202293167 A | 7/2012 |
| CN | 102067254 B | 9/2013 |
| CN | 103391901 A | 11/2013 |
| CN | 103431700 A | 12/2013 |
| DE | 3701387 A1 | 7/1988 |
| EP | 2332709 A1 | 6/2011 |
| GB | 1188125 A | 4/1970 |
| GB | 1213869 A | 11/1970 |
| JP | 2006029390 A | 2/2006 |
| JP | 2009154001 A | 7/2009 |
| JP | 2011012311 A | 1/2011 |
| JP | 2011047623 A | 3/2011 |
| KR | 20010113120 A | 12/2001 |
| KR | 101325466 B1 | 11/2013 |
| TW | 201037254 A | 10/2010 |
| TW | M460547 U | 9/2013 |
| WO | 98/04101 A1 | 1/1998 |
| WO | 9800274 A1 | 1/1998 |
| WO | 02065816 A1 | 8/2002 |

OTHER PUBLICATIONS

"Mould & Die Design and Manufacturing", edited by Jiren Li, Jianjun Zhai, p. 271, Xi'an: Xidian University Press, Feb. 28, 2010.

"Heat Treatment Manual", vol. 3, Heat Treatment Equipment and Work Auxiliary Materials, Revised Edition 4, edited by the Heat Treatment Society of Chinese Mechanical Engineering Society; pp. 181-182; Beijing: China Machine Press, Aug. 2013.

Intention to Grant received for European Patent Application No. 15704874.5, dated Sep. 25, 2020, 7 pages.

Extended European Search Report received for European Patent Application No. 21153388.0, dated May 3, 2021, 8 pages.

* cited by examiner

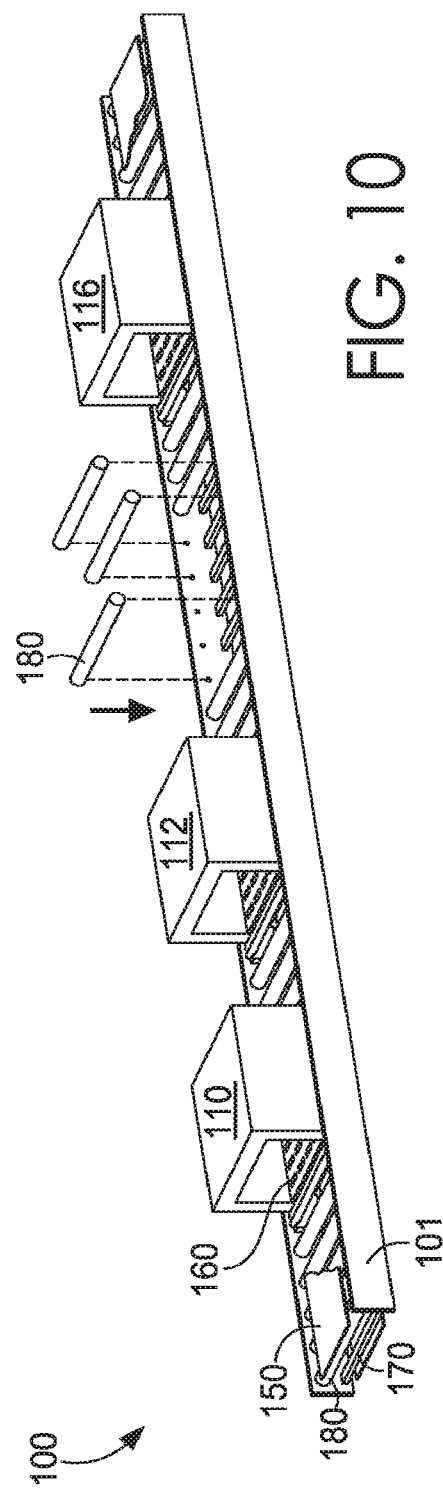
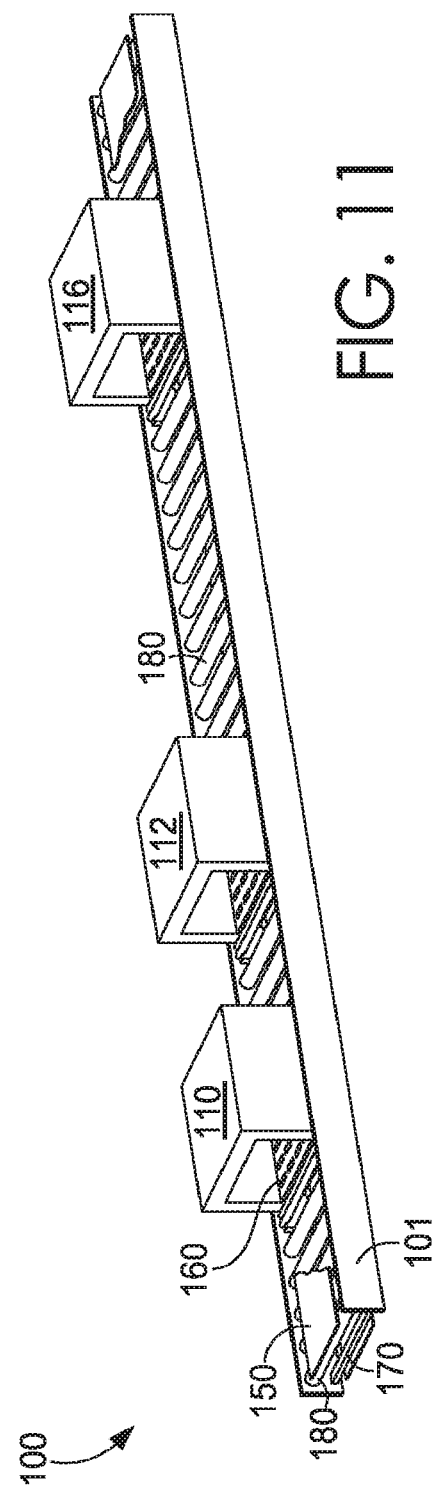

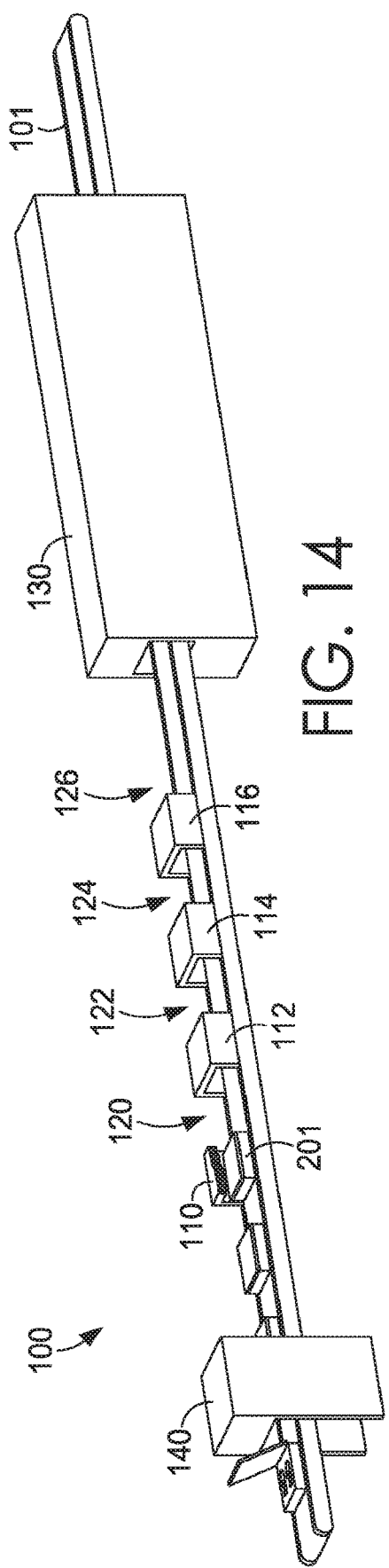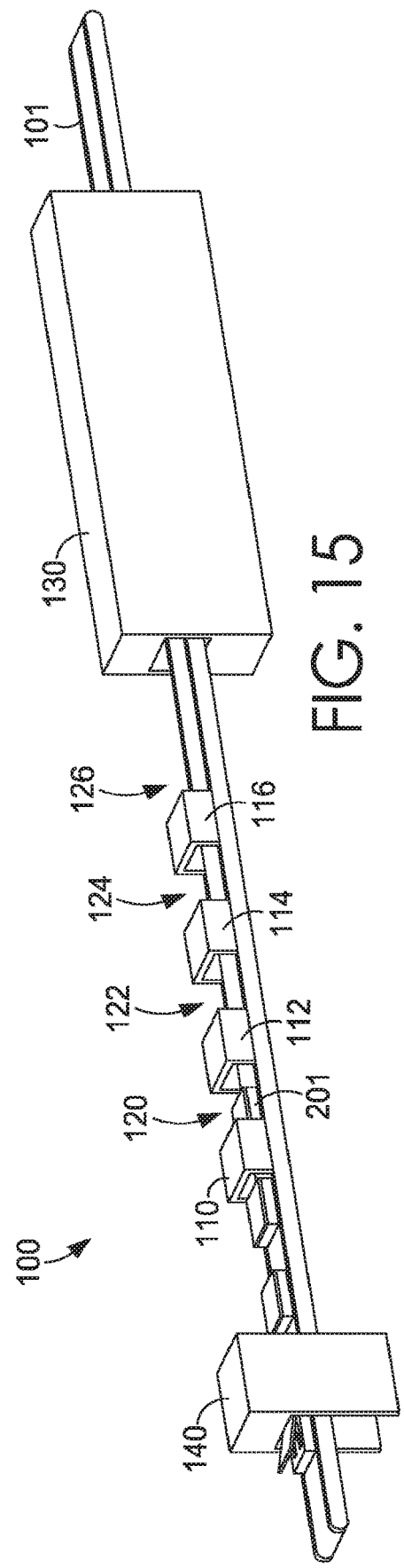

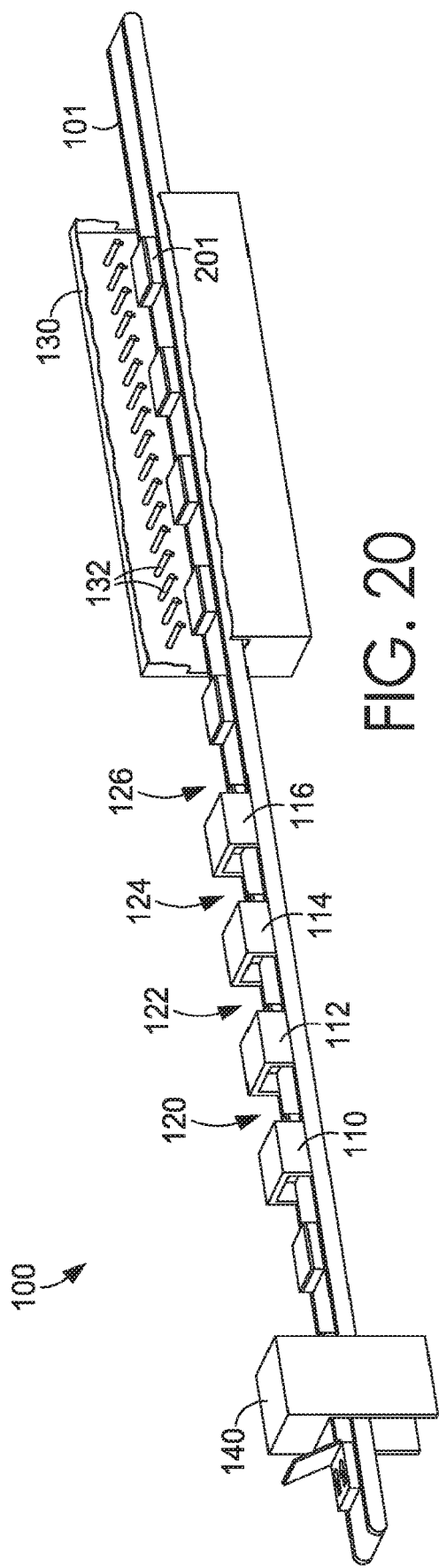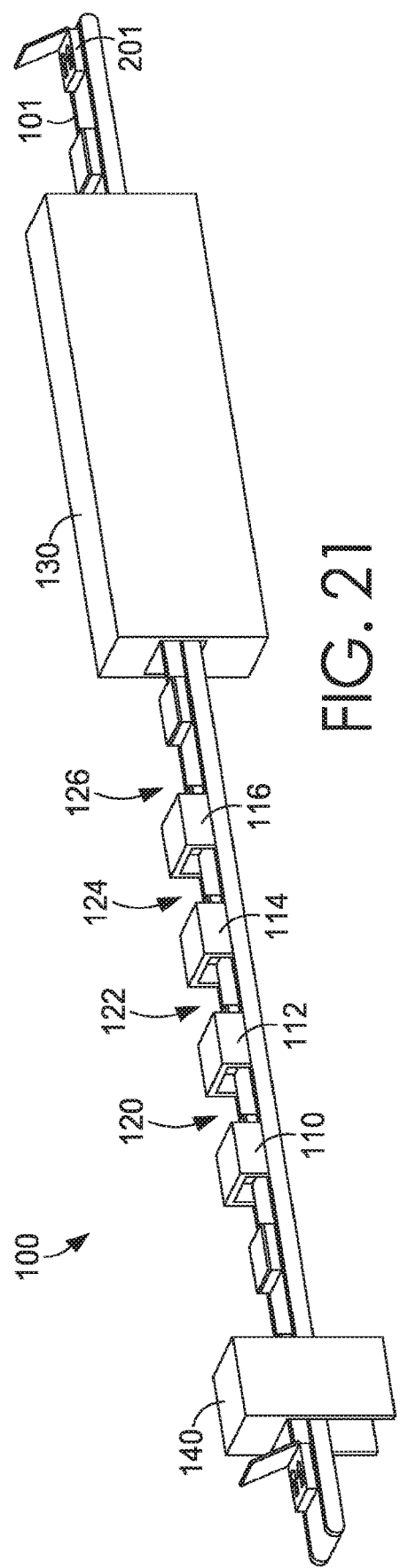

ADJUSTABLE CONVEYANCE CURING SYSTEM

CROSS-REFERENCE TO RELATED APPLICATIONS

The present application is a divisional of U.S. application Ser. No. 14/158,420, filed on 17 Jan. 2014 and having a title of "Conveyance Curing System," which is related by subject matter to U.S. application Ser. No. 14/158,419, filed on 17 Jan. 2014 and having a title of "Adjustable Conveyance Curing Method," which are all incorporated herein by reference in their entirety.

FIELD

Aspects of the present invention relate to heating a mold containing a moldable item. More particularly, the present invention relates to utilizing an induction heating assembly to cure an expanded foam structure. The present invention includes a dynamically adjustable conveyance mechanism for use in conveying the mold containing the moldable item. More specifically, the present invention relates to a dynamically adjustable conveyance mechanism capable of having various induction heating assemblies interchangeably integrated with the conveyance mechanism utilizing removable portions, such as rollers.

BACKGROUND

An article of footwear may be constructed with a foam sole portion. The formation of the foam portion may involve heating the foam portion utilizing one or more heating elements. However, a traditional heating element, such as an oven, used to heat and cure a foam item is continuously energized to maintain sufficient thermal energy and may be inefficient at heating the foam item. Further, an ability to control the heating and timing of the foam item may be limited with a traditional heating element.

SUMMARY

The present invention relates to the curing of foam items utilizing an adjustable system conveyance and modular induction heating assemblies to efficiently and controllably heat a mold containing the foam item. In order to achieve efficiencies and controllability, the present invention contemplates utilizing inactive zones and cooling mechanisms in connection with induction heating assemblies to regulate a temperature of the mold during the curing process. Aspects of the present invention also contemplate leveraging the dynamic adjustability of the conveyance system to provide for a modularity and adaptability of the various induction heating assemblies, inactive zones, and/or cooling mechanisms. A dynamic conveyance mechanism may have removable components, such as rollers, that allow for various components, such as an induction heating assembly, to be placed within the dynamic conveyance mechanism in locations where the removable rollers have been removed.

DRAWINGS

The drawings described herein are for illustrative purposes only of selected examples, wherein:

FIG. 10 illustrates a portion of an exemplary adjustable conveyance curing system having removable rollers being added to the adjustable conveyance curing system, in accordance with the present invention;

FIG. 11 illustrates a portion of an exemplary adjustable conveyance curing system with three induction heating assemblies, in accordance with the present invention;

FIGS. 12-21 illustrate a sequence of a mold being conveyed through an adjustable conveyance curing system in accordance with the present invention;

DETAILED DESCRIPTION

Figure 1:
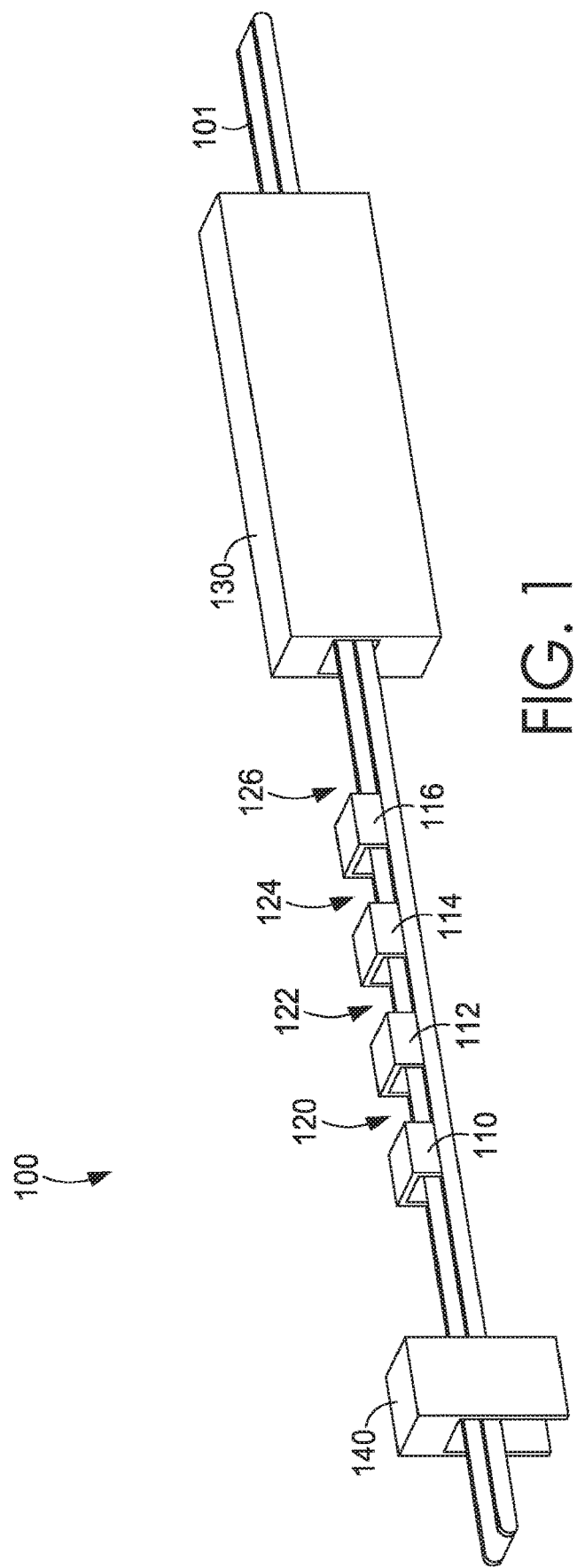
FIG. 1 illustrates a schematic diagram of an exemplary adjustable conveyance curing system in accordance with the present invention.

The present invention relates to using a modular and dynamically adjustable conveyance system in connection with one or more induction heating assemblies to heat a mold containing a foam item, in accordance with aspects of the present invention. For example, an expanded foam item may be heated in a mold to cure the expanded foam item. One particular example of products that commonly utilize foams that may be processed in accordance with aspects hereof include athletic shoes, which often utilize ethylene vinyl acetates ("EVA"), polyurethane, or other types of foams to provide cushioning for midsoles or elsewhere in the construction of a shoe. While the present invention is described in some examples with particular reference to foams, such as EVA foams, for use in a shoe, the present invention may be utilized with other types of materials to be heated in a mold and/or for use in products other than shoes. Further, while the term "shoe" is used for convenience herein, it is contemplated that a shoe is equivalent to an article of footwear, such as boots, sandals, and shoes, in an exemplary aspect.

Aspects of the present invention also relate to an adjustable system and methods that may be used to effect the curing of a foam item. More particularly, aspects of the present invention may concern electrically conducting coils configured into specific coil patterns for use in curing a foam item through an induction heating event. The coils configured into coil patterns may be housed within chambers and/or assemblies, such as induction heating assemblies, and used to cure a foam item contained within a mold responsive to the induction heating event. In some aspects, one, two, three, four, or more induction heating assemblies may be used to cure a foam item.

In aspects of the present invention, chambers, such as an induction heating assembly, may be used in conjunction with a dynamic conveyance mechanism in order to cure a foam item. A dynamic conveyance mechanism may have removable rollers that allow for chambers to be placed into areas where removable rollers have been removed. As such, utilizing a dynamic conveyance mechanism allows chambers to be placed into, taken out of, and moved around the dynamic conveyance mechanism. The flexibility of a dynamic conveyance mechanism provides for a curing process to be automated, adjusted, and customized to fit a production need. Further, the dynamic nature of the conveyance system also allows for components, such as a roller, that is also responsive to the induction heating event to be replaced with a component less reactive to the induction heating event.

In accordance with aspects of the present invention, a method for heating a mold containing a moldable item is provided. The method may include utilizing a first induction heating assembly and a second induction heating assembly. For example, the mold may be introduced to the first induction heating assembly to be heated to a first temperature utilizing the first induction heating assembly. Stated differently, a foam item contained within the mold may be heated to a first temperature by the first induction heating assembly. However, because of the thermal conductivity of a mold, an outer portion of the mold may reach a critical temperature prior to an internal portion of the mold reaching a desired temperature. Leveraging this, it is contemplated that the induction heating assemblies may effectively pulse the application of induction energy to the mold to keep the exterior of the mold below a critical temperature as the mold thermally conducts the heat energy toward the foam item contained therein, in an exemplary aspect. The method may include transferring the mold from the first induction heating assembly to the second induction heating assembly to allow for a second application of an induction heating event. The method may further include heating the mold to a second temperature utilizing the second induction heating assembly. As indicated above, the second temperature may include achieving a second temperature at an internal portion of the mold, such as near a cavity containing a foam item.

Additional aspects of the present invention may relate to a method for constructing a mold heating system comprised of a dynamically adjustable conveyance mechanism and a series of assemblies for heating, maintaining, and/or cooling a mold. More specifically, the method may include utilizing at least a first induction heating assembly, a second induction heating assembly, a conveyance mechanism having a plurality of removable metallic rollers and a plurality of removable non-metallic rollers. The method may include removing at least one metallic roller from a first portion of the conveyance mechanism corresponding to a placement of the first induction heating assembly. The method may also include placing the first induction heating assembly at the first portion of the conveyance mechanism, the first induction heating assembly having a non-metallic roller adjacently associated. The method may include removing at least one metallic roller from a second portion of the conveyance mechanism corresponding to a placement of the second induction heating assembly. The method may further include placing the second induction heating assembly at the second portion of the conveyance mechanism, the second induction heating assembly having a non-metallic roller adjacently associated.

Further aspects of the present invention may relate to a method for molding a foam portion of a footwear item using one or more induction heating assemblies on a dynamically adjustable conveyance mechanism. The method may include positioning the foam portion into a mold having a top surface, a bottom surface, a front surface, a back surface, a first side surface, and a second side surface. The method may include applying pressure to close the mold and conveying the mold through an induction coil assembly, the induction coil assembly being configured to surround the mold on at least the top surface, the bottom surface, the first side surface, and the second side surface, in an exemplary aspect. However, as contemplated herein, the induction coil may be configured to surround or be proximate to one or more of the surfaces of the mold, in an exemplary aspect. The method may include heating the mold as it passes through or near the induction coil assembly, transferring the mold to a cooling chamber, spraying fluid onto the mold at the cooling chamber to cool the mold, and removing the foam portion from the mold.

An exemplary system for facilitating aspects provided herein may include a first removable induction heating assembly adapted to receive a mold and a second removable induction heating assembly adapted to also receive the mold. The system may further include a conveyance mechanism supporting or associated with both the first removable induction heating assembly and the second removable induction heating assembly. The conveyance mechanism may have a first set of removable rollers. It is contemplated that the removable rollers may be formed from a material that is reactive to the induction heating assemblies, such that the induction heating event also causes a sufficient change in thermal energy within the removable roller. As such, it may be advantageous to remove the removable rollers to provide space for the induction heating assembly as well as a tolerance region near the induction heating assembly with less reactive rollers. The conveyance mechanism may include a belt supported at least partially by the first set of rollers, the belt passing at least partially through the first removable induction heating assembly and the second removable induction heating assembly such that the mold, when positioned on the belt, can be conveyed between and at least partially through the first removable induction heating assembly and the second removable induction heating assembly. However, it is contemplated that instead of a belt, the rollers themselves may be powered such that they rotate to cause the movement of an object, such as a mold. The first removable induction heating assembly and the second removable induction heating assembly can be flexibly located at numerous positions along the conveyance mechanism by selectively removing and replacing various rollers of the first set of rollers.

Further, aspects of the present invention may relate to an induction heating assembly for receiving a metallic mold containing a foam item and moveable to a variety of positions along a production line. The induction heating assembly may include a non-metallic housing having an entrance and an exit, the non-metallic housing being adapted to receive the metallic mold into the non-metallic housing through an entrance and to have the metallic mold removed from the non-metallic housing through an exit. The induction heating assembly may include an induction coil positioned in the non-metallic housing and having an internally defined cavity aligned with the non-metallic housing entrance and exit, the induction coil being adapted to receive the metallic mold such that at least a portion of the metallic mold is surrounded by the induction coil. The induction heating assembly may further include at least one non-metallic roller positioned in the cavity and adapted to support movement of the metallic mold when in the cavity, the at least one non-metallic roller being supported by at least a portion of the non-metallic housing.

As indicated above, aspects of the present invention relate to an adjustable system and methods that may be used in the curing of a foam item. FIG. 1 illustrates an exemplary system 100 that may be used to cure a foam item. The system 100 has a dynamic conveyance mechanism 101, induction chambers 110, 112, 114, and 116, soaking zones 120, 122, 124, and 126, cooling mechanism 130, and pressing chamber 140. However, while specific components and specific relationships are depicted and described in connection with the figure discussed hereinafter, it is contemplated that a system similar to the system 100 may be comprised of any number and in any combination of components. Induction chambers 110, 112, 114, and 116 are induction heating assemblies that leverage an induction heating event to heat one or more objects placed in proximity or therein. For example, induction chambers may have induction coils of various patterns that may be used to cure a foam item contained within a mold. Soaking zones 120, 122, 124, and 126, which may also be referred to as inactive zones, may be areas within system 100 that are inactive zones that are free from induction coils and/or heating by any induction heating assemblies. Further, soaking zones 120, 122, 124, and 126 may be areas of system 100 that may be free from cooling mechanisms, such as cooling mechanism 130. As will be discussed in greater detail hereinafter, the soaking zones may be effective for allowing thermal energy to be conducted from an outer surface of an item, such as a metallic mold, to an internal portion, such as a surface of a mold cavity formed in the mold.

Induction heating is the process of heating an electrically conducting object, such as a mold, by electromagnetic induction. The electromagnetic induction produces eddy currents (which may also be called Foucault currents) within the electrically conducting object. Resistance within the electrically conducting object leads to Joule heating of the electrically conducting object. Joule heating, also known as ohmic heating and resistive heating, is the process by which the passage of an electric current, such as the produced eddy currents, through a conductor, such as the electrically conducting object, produces heat. To achieve this induction heating event, the induction heating assemblies have an electromagnet, through which a high-frequency alternating current (AC) is passed. The frequency of AC used depends on the object size, material type, coupling (between the work coil and the object to be heated) and the penetration depth. As will be discussed hereinafter, the electromagnet is formed from coils having a specific number of turns and dimensions based on the range of molds to be passed through the magnetic field generated by the coil(s).

Induction heating of a mold provides benefits that may not be realized through traditional oven heating. For example, induction heating allows for the mold itself to be heated as opposed to the fluid (e.g., air) surrounding the mold. Further, because of the nature of using electromagnetic energy, an induction heating assembly may alternate between an energized (i.e., producing an electromagnetic field) and a non-energized state depending on the location of the mold relative to the heating assembly. A traditional oven that requires heating of a volume of fluid to conduct heat to the mold is not efficiently energized and non-energized for the cycle times anticipated for aspects of the process provided herein. Further, the ability to strategically position and reposition induction heating assemblies, as will be described in more detail hereinafter, allows for a production flexibility that is beneficial in the construction of portions of an article of footwear. For example, because of the thermal conductivity of a mold, heat generated or applied to a surface of a mold may take time to conduct to an internal portion of the mold. The ability to position induction heating assemblies at variable locations allows for different mold characteristics to be adapted for achieving a desired internal temperature of the various molds on a common assembly line, in an exemplary aspect.

The dynamic conveyance mechanism 101, induction chambers 110, 112, 114, and 116, soaking zones 120, 122, 124, and 126, cooling mechanism 130, and pressing chamber 140 of the system 100 will be discussed in greater detail hereinafter.

Figure 2A:
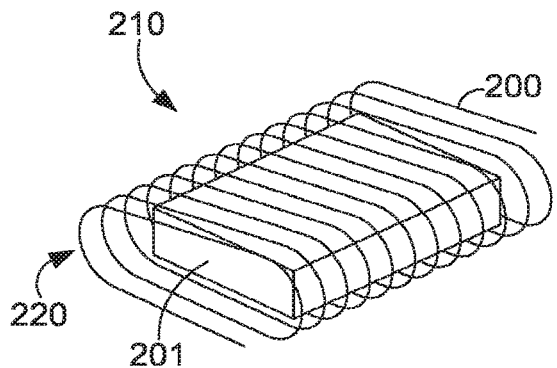
FIGS. 2A-2F illustrate exemplary coil pattern configurations in accordance with the present invention.
Figure 2B:
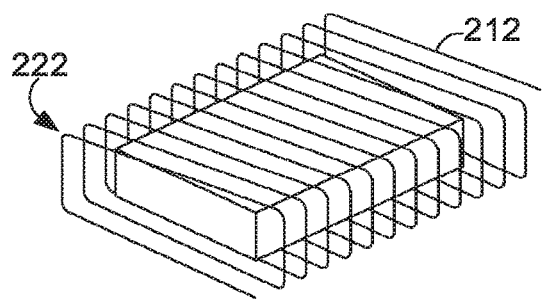
Figure 2C:
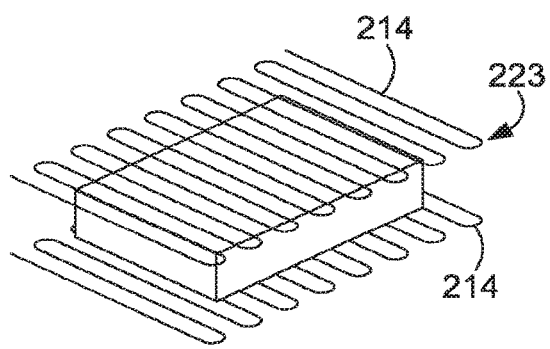
Figure 2D:
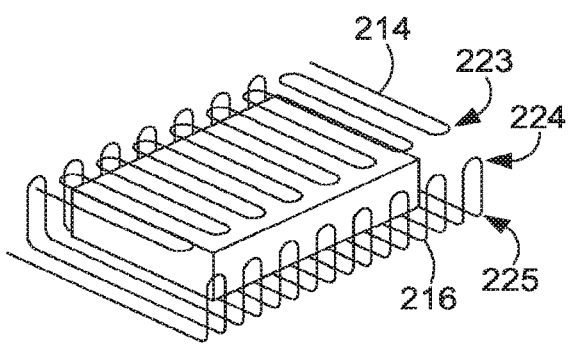
Figure 2E:
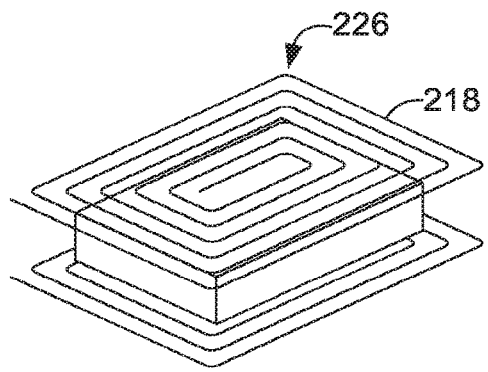
Figure 2F:
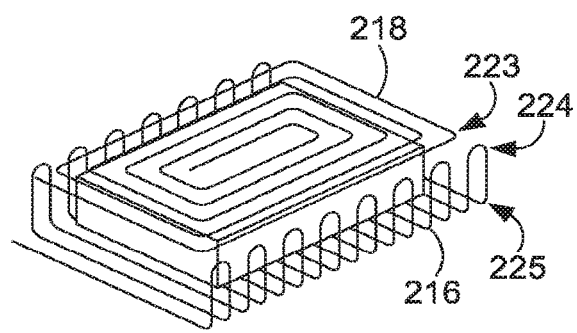

As briefly described above, aspects of the present invention may utilize coils configured into various patterns to generate the electromagnetic energy used in induction heating to ultimately cure a foam item. FIGS. 2A-2F illustrate various exemplary coil patterns that may be used in aspects of the present invention. It is contemplated that any portion of any of the illustrated coil patterns may be combined with other portions. Additionally, it is contemplated that some portions depicted of a coil configuration may be omitted entirely in exemplary aspects. FIG. 2A illustrates a unified coil pattern 210 having coils that may be located in more than one plane and surround a first side, a second side, a top surface and a bottom surface of mold 201. Coil pattern 210 has several turns 220 where the arc of each turn may be between 30 degrees and 180 degrees. For example, the portions of the coil pattern 210 proximate to the first side and the second side of the mold 201 are a continuous curve, such as a half circle. This is in contrast to FIG. 2B discussed hereinafter having linear portions extending along the side walls of the mold. FIG. 2B illustrates a unified coil pattern 212 having coils that may be located in more than one plane and surround mold 201. Coil pattern 212 has several turns 222 where the arc of each turn may be 90 degrees. In the vertical direction between each of the turns in the coil pattern 212, a linear portion may be present. This linear portion produces a different induction heating effect on the mold than the continuous curve provided in the coil pattern 210 of FIG. 2A. FIG. 2C illustrates a coil pattern 214 that may be located above mold 201 and below mold 201. Coil pattern 214 may be located in one plane that is located above, below, or on any side of mold 201. Coil pattern 214 may have turns 223 where an arc of each turn is 180 degrees while remaining in the same plane. In this example, a coil pattern is not present along a first side and a second side of a mold. Instead, the coil pattern 214 is planar above and below a mold, which may provide flexibility in mold width alternatives, in an exemplary aspect. FIG. 2D illustrates coil pattern 214 and a coil pattern 216 used in combination. Coil pattern 214 may be located above a mold in a substantially planar arrangement. Coil pattern 216 may be located below and along one or more sides of the mold. Additionally, coil pattern 216 may have coils that may be located in more than one plane and correspond to a bottom, side, and/or top of mold 201. For example, it is contemplated that the coil pattern 216 extends in a first horizontal plane as well as in two parallel planes (e.g., vertical) that are both substantially perpendicular to the horizontal plane. As such, the coil pattern 216 extends around at least three sides of a mold (e.g., bottom surface, a first side surface and an opposite second side surface). Coil pattern 216 may have turns that have arcs 224 of 180 degrees in the vertical planes. Additionally, coil pattern 216 may have folds located near an intersection between a first plane and a second plane, where the folds 225 each have an angle of 90 degrees to transition the coil from the horizontal plane to the vertical plane. FIG. 2E illustrates a coil pattern 218 that may be located substantially in a plane above a mold and/or a plane below the mold. Coil pattern 218 may be located within one plane and may have turns 226 that are 90 degree angles forming a linear segment spiral, such that linear portions extend between each of the turns 226. As in FIG. 2C, the coil pattern 218 in FIG. 2E does not extend along a first and second side of a mold, which may allow for flexibility in mold dimensions as they pass through the generated magnetic field(s). FIG. 2F illustrates coil pattern 218 as discussed in FIG. 2E being located above a mold and coil pattern 216, as discussed in FIG. 2D, located below and along sides of the mold. As can be appreciated, it is contemplated that any combination of coil patterns having different number of turns, folds, sizes, dimensions, and other variables may be utilized to achieve aspects of the present invention.

In addition to the pattern of each coil and the angle of each turn, each coil may have additional parameters designed to heat a mold to cause the cure of a particular foam item. Parameters of a coil may include, for instance, a number of turns, an inductance, and a frequency associated therewith. For instance, a coil may have 4, 6, 8, 9, 12, 15 or more turns. Additionally, in some aspects, a coil may have an inductance of 12, 13, 14, 15, 16, 17, or 18 uH and a frequency of 12, 13, 14, 15, 16, 17, or 18 kHz. In certain aspects, a coil may have an induction of between 13 uH and 15 uH (e.g., 14.18 uH) and a frequency between 13 kHz and 15 kHz (e.g., 14.49 kHz), in an exemplary aspect. Additionally, in heating a mold containing a foam item, a coil may be energized for a specific period of time based on the coil pattern, the mold, the foam item, a speed at which the mold passes through a related magnetic field, a desired temperature achieved internally at the mold, a critical temperature to stay below at an external portion of the mold, and the like.

Figure 3:
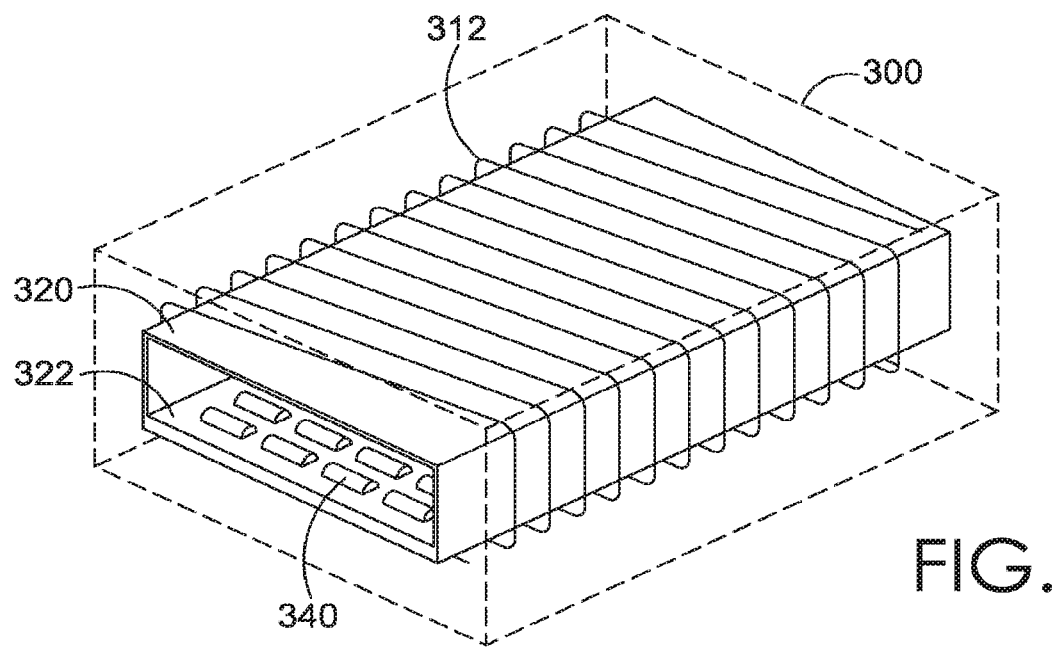
FIG. 3 illustrates a partial view of an exemplary induction heating assembly in accordance with the present invention.

Further, in some aspects a coil may be housed within a chamber to form an induction heating assembly. FIG. 3 illustrates an induction heating assembly 300 configured to house induction coils 312 and a mold. As shown, induction heating assembly 300 houses induction coils 312 having a coil pattern, such as the coil pattern 212 discussed with FIG. 2B hereinabove. However, in additional aspects, induction heating assembly 300 may house coils having any combination of coil patterns 210, 212, 214, 216, and 218, as shown in FIGS. 2A-2F. Induction coils 312 surround an inner chamber 320 having a cavity 322. Within cavity 322 are one or several chamber rollers 340 that may be made of various types of materials, including various non-metallic materials or non-electrically conductive materials that are less responsive to the induction heating effect generated within the cavity 322. Chamber rollers 340 may allow a belt, such as a conveyor belt, to pass over the chamber rollers 340 and through the cavity 322 of inner chamber 320. Chamber rollers 340 may allow a foam item to pass through the cavity 322 so that the foam item may be cured utilizing induction coils 312. More specifically, it is contemplated that chamber rollers 340 may allow a mold containing a foam item to pass through the cavity 322 so that the foam item may be cured utilizing induction coils 312. It is also contemplated that the rollers alone may be used and a belt may be omitted. In this example, the rollers may be powered or an alternative movement mechanism (e.g., pushing, pulling) may be implemented to pass the mold through the cavity 322.

One or several induction heating assemblies may be used in conjunction with one another to adapt the system for a variable curing effect that is adapted for a particular mold, foam item, or other component. Utilizing one or several induction heating assemblies, in some aspects, a mold may be heated to a first temperature within a first induction heating assembly and then heated to a second temperature within a second induction heating assembly. In some aspects, a third and a fourth induction heating assembly may be used to heat the mold to a third and fourth temperature. Further, as provided above, it is contemplated that the temperature of the mold may be measured at an external surface or an internal surface, such as a surface forming a mold cavity within the mold. This difference in temperature at different locations of the mold may be caused, in part, by the thermal conductivity of the mold and the thermal mass of the mold.

In some aspects, soaking zones may be used to facilitate a mold reaching a specific temperature. A soaking zone may be an area that is separate from an induction heating assembly (or separated from an energized induction heating assembly) and/or any forms of heating. For instance, in some aspects, a first induction heating assembly may be used to heat a mold to a first temperature (e.g., at an external surface or an internal surface). After exiting the first induction heating assembly and prior to the mold entering a second induction heating assembly, the mold may enter a first soaking zone. While in the first soaking zone, the mold may reach an intermediate temperature. The intermediate temperature may be between the first temperature and a second temperature. It is contemplated that the intermediate temperature may be slightly lower than the first temperature at the external surface, but it is also contemplated that the intermediate temperature is greater than the first temperature at an internal portion of the mold. After reaching the intermediate temperature, the mold may enter the second induction heating assembly and be heated to the second temperature.

In various aspects of the present invention, various induction heating assemblies and soaking zones may be used. For instance, four induction heating assemblies and four soaking zones may be used where each soaking zone is between each induction heating assembly. Similarly, it is contemplated that a dwell time within a soaking zone or as influenced by an induction heating assembly may be adjusted to achieve a desired intermediate temperature. For example, on a moving conveyor having a constant speed, the dwell time may be changed in the soaking zone by changing a length between induction heating assemblies. The rate of the conveyor belt movement may also be manipulated to change a dwell time in the soaking zone (and exposure to induction heating effects within the induction heating assemblies).

Figure 4:
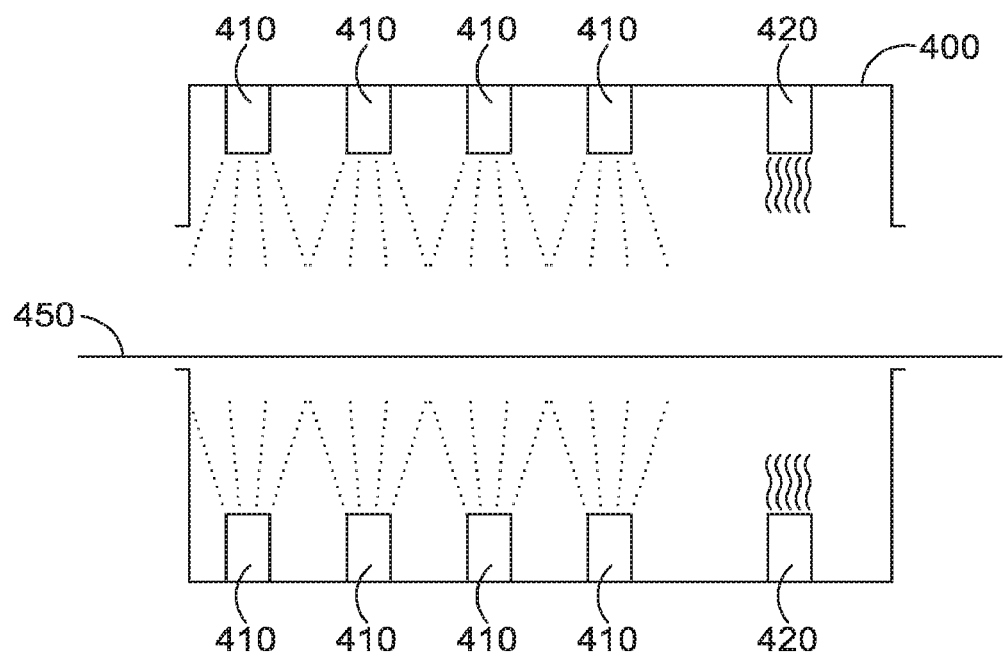
FIG. 4 illustrates an exemplary cooling mechanism in accordance with the present invention.

Additionally, in some aspects a cooling mechanism and/or a cooling chamber may be used to reduce a temperature of a mold, such as to a specific temperature. FIG. 4 illustrates a schematic cross sectional view of a cooling mechanism 400 having fluid (e.g., liquid) jets 410, air jets 420, and a belt 450 running through the cooling mechanism 400. Fluid jets 410 may project fluid toward an item, such as a mold containing a foam item. As used herein with connection to the fluid jets 410, fluid may be any type of liquid. Air jets 420 may project air towards an item, such as a mold containing a foam item. As used herein, air may be any type of gas. As such, it is contemplated that the air jets 420 may not only be effective for cooling an item, but it may also help dry an item after passing through the fluid jets 410. Further, it is contemplated that the evaporative effect experienced by the drying of an item by the air jets 420 may further aid in cooling the item. In aspects of the present invention, a cooling chamber 400 may have 1, 2, 3, 4, 5, 6, 8, 10 or more fluid jets 410 projecting at any angle and location, such as vertically and laterally. Fluid jets 410 may be located above, below, and/or along a side of an item being conveyed through cooling chamber 400. Additionally, cooling mechanism 400 may have 1, 2, 3, 4, 5, 6, 8, 10 or more air jets 420. Air jets 420 may be located above, below, and/or along a side of a foam item being conveyed through cooling mechanism 400. Further, it is contemplated that the belt 450, as will be discussed hereinafter, is adapted to aid in the transmission of fluid and air from one or more jets to the item being transported. For example, the belt 450 may be permeable to air and fluid, such as through voids or other perforations.

In certain aspects, a combination of induction heating assemblies, soaking zones, and/or cooling mechanisms may be used to achieve and regulate a temperature of a mold. For instance, a mold may be heated to a first temperature utilizing a first induction heating assembly. The mold may reach an intermediate temperature utilizing a soaking zone. The mold may be heated to a second temperature utilizing a second induction heating assembly. After a foam item maintained therein achieves a desired temperature for a determined amount of time, the mold may be cooled to a final temperature utilizing a cooling mechanism. The final temperature may be equal to or less than the first temperature, intermediate temperature, and/or second temperature. In aspects where a mold reaches a third, fourth, or more temperature, the final temperature may be equal to or less than the third, fourth, or any temperature a mold item reached prior to entering the cooling mechanism.

In some aspects of the present invention, a dynamic conveyance mechanism may be used to, among other things, move a mold into and out of a pressing chamber, an induction heating assembly, a soaking zone, and/or a cooling mechanism. The dynamic conveyance mechanism may have side walls, bars, removable rollers, temporary rollers, temporary roller holders, and/or a belt. As will be described further herein, several removable rollers may be removed from an area of the dynamic conveyance mechanism such that an entity component, such as an induction heating assembly described above, may be placed in the vacated area of the dynamic conveyance mechanism. As such, utilizing the modular nature of the removable rollers allows one or multiple assemblies/components to be placed into the dynamic conveyance mechanism, interchanged with one another, moved within and removed from the dynamic conveyance mechanism. In some aspects, the assemblies may be curing chambers, heating chambers, soaking chambers, cooling chambers, and/or cleaning chambers.

Figure 5:
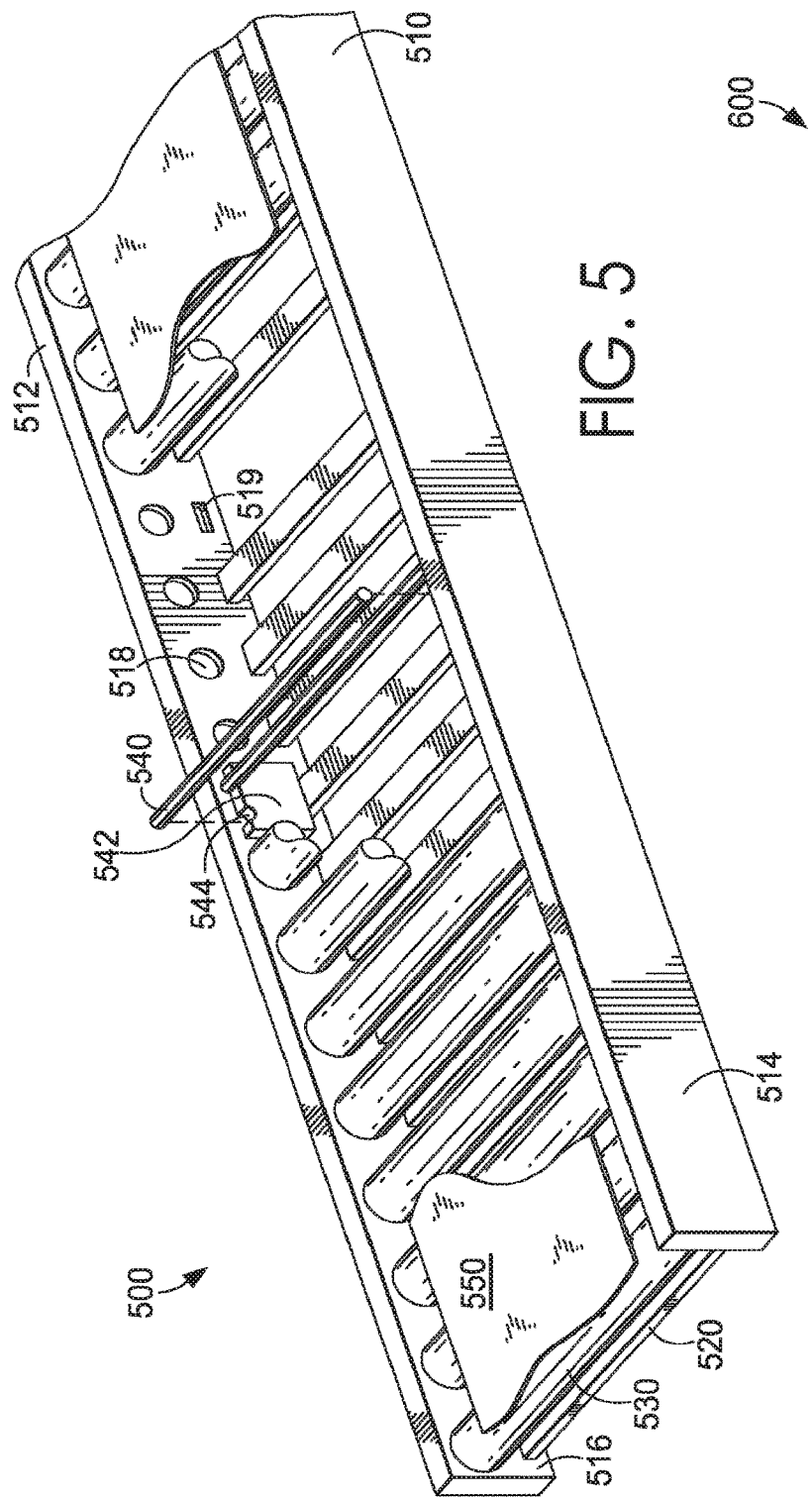
FIG. 5 illustrates an exemplary dynamic conveyance mechanism having components selectively replaced in accordance with the present invention.

Referring now to FIG. 5, which illustrates a perspective view of a portion of a dynamic conveyance mechanism, 500. Dynamic conveyance mechanism 500 may have a first side panel 510, a second side panel 512, bars 520, removable rollers 530, temporary rollers 540, temporary roller holders 542, and a belt 550.

First side panel 510 and second side panel 512 may be made of wood, plastic, metal, and/or any other type of material. Side panels provide for structural members extending at least a portion of the length of the dynamic conveyance mechanism 500. Each side panel may have an outer side and an inner side. First side panel 510 may have an outer side 514 and an inner side (not shown). Second side panel 512 may have an outer side (not shown) and an inner side 516. Each inner side of a side panel, such as inner side 516, may have recessed holders, such as recessed holders 518 and 519 that may hold an end of removable rollers 530 and bars 520. For instance, a recessed holder may be recessed inwardly away from an inner side of a side panel towards an outer side of the side panel such that a portion of a removable roller and/or bar may be placed within the recessed holder. A recessed holder may be of various shapes, such as round, circular, or square. Recessed holders may be designed to match a shape of removable rollers 530 and/or bars 520. In some aspects, a depth of recessed holder 518 may be greater than a depth of recessed holder 519. In other aspects, the depth of recessed holder 518 may be less than or equal to the depth of recessed holder 519. It is contemplated that instead of relying on recessed holding areas, other coupling features may be utilized to effectively couple one or more elements of the dynamic conveyance mechanism 500 to the side panels.

Bars 520 may be located below removable rollers 530 and may be used to provide support for an item, such as a chamber. Bars 520 may also provide structural support to the dynamic conveyance mechanism 500 as they effectively connect and maintain the side panels in a fixed position. Bars 520 may be made out of a metallic material, a non-metallic material and/or any other type of material. In an exemplary aspect, the bars 520 are formed from a non-metallic material in at least a location configured to be adjacent with a chamber, in an exemplary aspect. Bars may be permanently or removeably attached to a side panel, such as first side panel 510 and/or second side panel 512. Bars 520 may be attached to a side panel utilizing recessed holders, such as recessed holders 519. Additionally, bars 520 may be of any shape, including round, square, and triangular.

Removable rollers 530 may be located above bars 520. Removable rollers 530 may be made out of wood, plastic, metal, and/or any other type of material. In certain aspects, removable rollers are metallic. A removable roller is configured to roll when belt 550 moves over a surface of each removable roller. Removable rollers 530 may be attached to a side panel utilizing recessed holders, such as recessed holders 518. Removable rollers 530 may be permanently or removeably attached to a side panel, such as first side panel 510 and/or second side panel 512. In aspects of the present invention, removable rollers 530 may be removeably attached to a side panel such that each end of a removable roller may be placed within recessed holders 518 and held within dynamic conveyance mechanism 500 utilizing the recessed nature of recessed holder 518. While placed in dynamic conveyance mechanism 500, removable rollers 530 may provide support to belt 550 as the belt 550 is conveyed along dynamic conveyance mechanism 500. In aspects, removable rollers 530 may be easily removed from dynamic conveyance mechanism 500 by disengaging each removable roller 530 from a recessed holder. It is further contemplated that the removable roller 530 includes one or more friction reduction components, such as ball bearings, to reduce a rotational resistance of the removable roller 530.

Temporary rollers 540 may be located above bars 520. Temporary rollers 540 may be made out of wood, plastic, metal, and/or any other type of material. In certain aspects, temporary rollers are formed from a non-electrically conductive material, such as a non-metallic material. The non-electrically conductive nature of the material from which the temporary rollers 540 may be formed is so they are less susceptible to induction heating events along the dynamic conveyance mechanism 500. In additional aspects, temporary rollers 540 may be made of polytetrafluoroethylene (PTFE). Temporary rollers 540 may be configured to roll when belt 550 moves over a surface of each temporary roller 540. Temporary rollers 540 may be placed within dynamic conveyance mechanism 500 utilizing temporary roller holders 542. Temporary roller holders 542 are configured to be placed on top of bar 520 and have grooves, such as grooves 544, configured to support temporary rollers 540. It is further contemplated that the temporary roller holders 542 are adapted to be received in the vacated recessed holders 518 to further enhance the modularity and dynamic adaptability of the dynamic conveyance mechanism 500.

As will be discussed in FIG. 7B hereinafter, it is contemplated that the temporary roller 540 has a diameter that is less than that of the removable roller 530. This difference in diameter may allow the temporary roller 540 to be positioned proximate an induction heating assembly to help transition the belt 550 into the assembly. A larger diameter roller, such as the removable roller 530, may interfere with the assembly based on the dimensions of the assembly as positioned in the dynamic conveyance mechanism 500, in an exemplary aspect.

Belt 550 may be placed on top of removable rollers 530 and/or temporary rollers 540. Belt 550 may be made out of one or multiple materials, including cotton and rubber. Belt 550 may be configured to wrap around a top portion and a bottom portion of dynamic conveyance mechanism 500. As provided above, it is contemplated that the belt 550 is formed from a material that has a low reactive nature to the induction heating assemblies, such as a non-metallic material. In particular, it is contemplated that the belt 550 is formed, at least in part, with PTFE, or other polymer materials. Further, it is contemplated that the belt 550 may be adapted to allow air and liquid to pass through the belt within a cooling chamber, such as with voids or perforation included therein, in an exemplary aspect.

Figure 6:
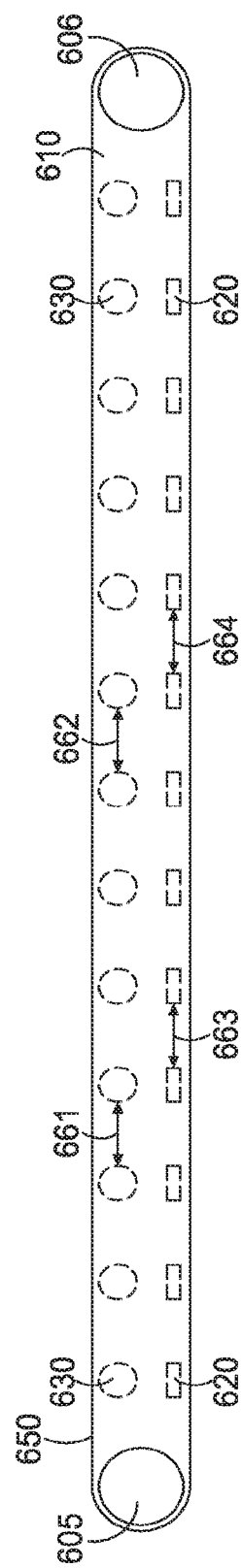
FIG. 6 illustrates a side perspective view of a dynamic conveyance mechanism in accordance with the present invention.

FIG. 6 illustrates a side view of dynamic conveyance mechanism 600. FIG. 6 illustrates a first pulley 605 (e.g., a tensioning roller or a drive roller), a second pulley 606, bars 620, removable rollers 630, and belt 650. Each removable roller 630 may be a first distance 661 or second distance 662 from one another. In some aspects, first distance 661 is equal to the second distance 662 such that each removable roller 630 is equally spaced from one another. However, it is contemplated that varied spacing may be implemented as well. Similarly, a first distance 663 between bars 620 and a second distance 664 between bars 620 may be equal or different in exemplary aspects.

Figure 7A:
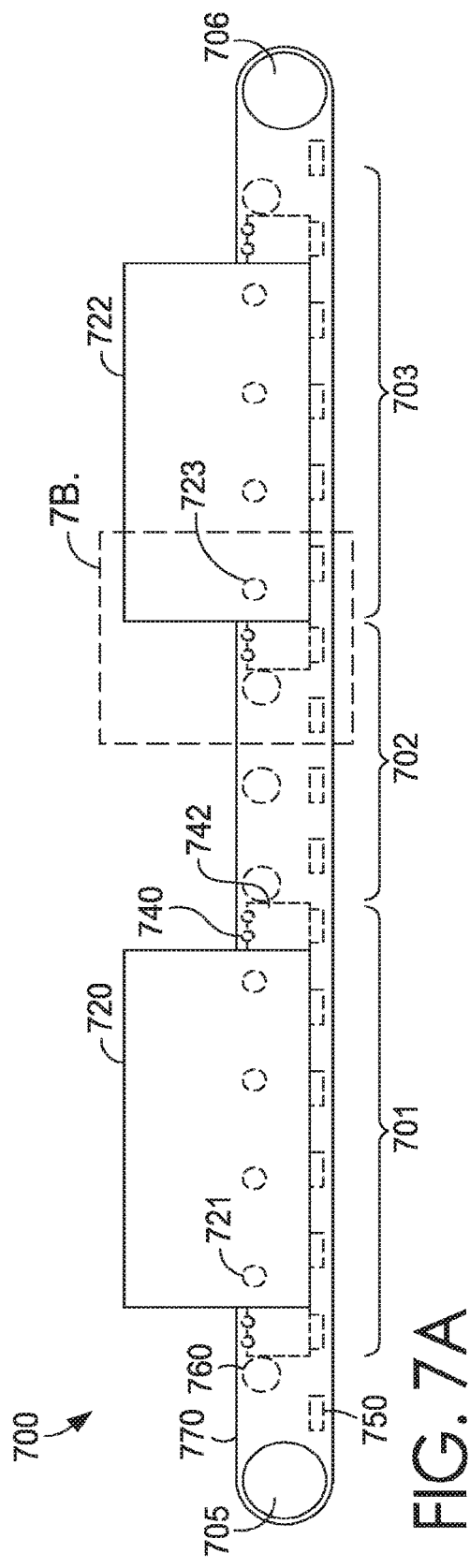
FIG. 7A illustrates a side perspective view of a dynamic conveyance mechanism and exemplary assemblies, such as induction heating assemblies, integrated therein, in accordance with the present invention.
Figure 7B:
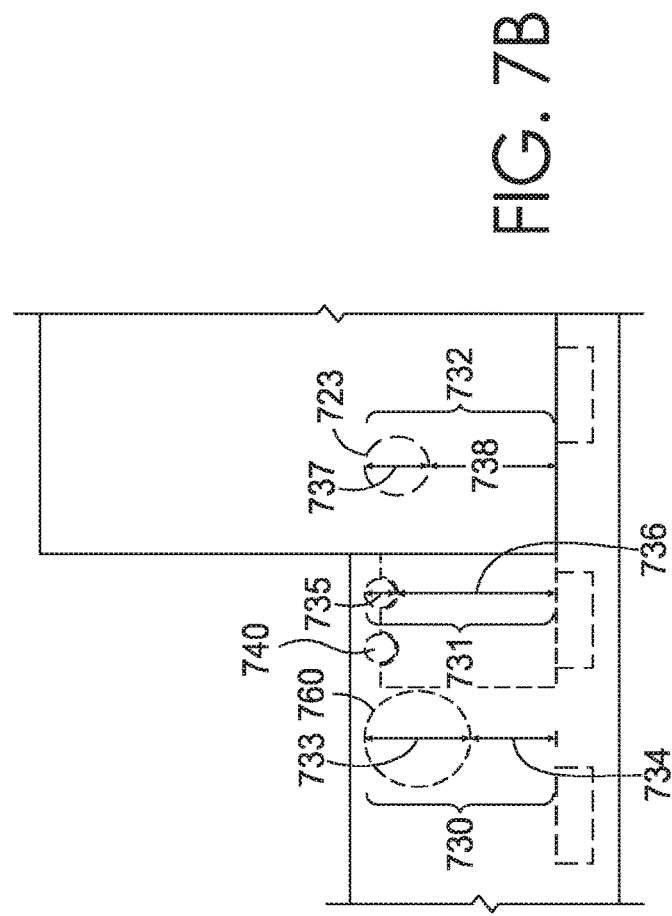
FIG. 7B illustrates an enlarged side perspective view from FIG. 7A of a portion of the dynamic conveyance mechanism and an exemplary assembly integrated therein, in accordance with the present invention.

FIG. 7A illustrates another side view of dynamic conveyance mechanism 700 having a first pulley 705, a second pulley 706, bars 750, removable rollers 760, belt 770, temporary rollers 740, temporary roller holder 742, a first chamber 720 having first chamber rollers 721, and a second chamber 722 having second chamber rollers 723. As shown in FIG. 7B, each removable roller 760 may have a diameter of 733 and be placed a distance 734 from bars 750 creating a total distance 730 from bars 750 to belt 770. Each temporary roller 740 may have a diameter 735 and be placed a distance 736 from bars 750 creating a total distance 731 from bars 750 to belt 770. Each chamber roller, such as second chamber roller 723, may have a diameter 737 and be placed a distance 738 from bars 750 creating a total distance 732 from bars 750 to belt 770. In some aspects, distances 730, 731, and 732 may be equal to one another. In other aspects, distance 730 may be greater or less than distance 731 and/or distance 732. In additional aspects, distance 731 may be greater than or less than distance 730 and/or 732.

Returning to FIG. 7A, which illustrates first chamber 720 being located at a first area 701. First area 701 has removable rollers 760 removed from dynamic conveyance mechanism 700. First area 701 has a temporary roller holder 742 adjacently associated with a first side and a second side of first chamber 720. Temporary roller holder 742 may hold two temporary rollers. In some aspects, temporary roller holder may hold more or less than two temporary rollers. Additionally, first chamber 720 has first chamber rollers 721 located inside first chamber 721. First chamber 720 is separated from second chamber 722 by a second area 702, such as a soaking area. Second area 702 has removable rollers 760 placed within dynamic conveyance mechanism 700. A third area 703 has removable rollers 760 removed from dynamic conveyance mechanism 700. Third area 703 has a temporary roller holder 742 holding two temporary rollers on each side of second chamber 722. Second chamber 722 is supported above and by the bars 750. Additionally, second chamber 722 has second chamber rollers 723 located inside second chamber 722.

Figure 7C:
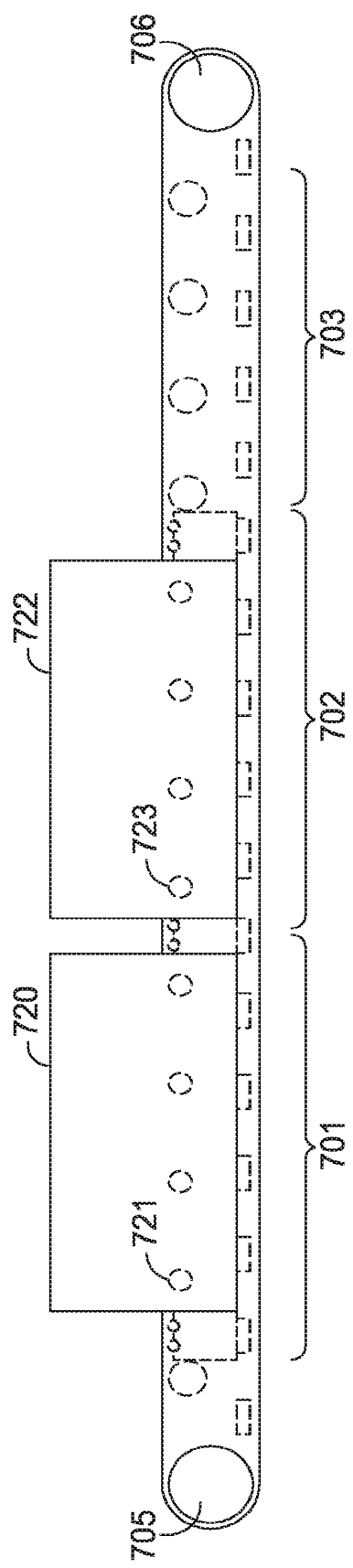
FIG. 7C illustrates a side perspective view of a dynamic conveyance mechanism in accordance with the present invention.

FIG. 7C illustrates second chamber 722 moved from third area 703 to second area 702 as to show the dynamic nature of the dynamic conveyance mechanism 700. In moving second chamber 722 from third area 703 to second area 702, the removable rollers that were located in second area 702 are removed and replaced with second chamber 722. Third area 703 may have removable rollers placed within the dynamic conveyance mechanism 700 after second chamber 722 is removed.

Aspects of the present invention may implement various methods for curing a foam item utilizing the induction coils, chambers, induction heating assemblies, dynamic conveyance mechanisms, and cooling mechanisms described herein. Referring briefly back to FIG. 1, the exemplary system 100 is illustrated. System 100 has a dynamic conveyance mechanism 101, induction heating assemblies 110, 112, 114, and 116, soaking zones 120, 122, 124, and 126, cooling mechanism 130, and pressing chamber 140. Dynamic conveyance mechanism 101 may be similar to dynamic conveyance mechanism 700 of FIGS. 7A-7C. Induction heating assemblies 110, 112, 114, and 116 may each be similar to induction heating assembly 300 of FIG. 3 and first and second chambers 720 and 722 of FIGS. 7A-7C described above. Soaking zones 120, 122, 124, and 126 may be areas within system 100 that are inactive zones and are free from induction heating. Further, soaking zones 120, 122, 124, and 126 may be areas within final curing system 100 that may be free from cooling mechanisms, such as cooling mechanism 130. Cooling mechanism 130 may be similar to cooling mechanism 400 of FIG. 4 as described above. Pressing chamber 140 may be used to close a lid of a mold. For example, it is contemplated that the pressing chamber 140 provides a predetermined amount of force to a mold to ensure sufficient mating between a top portion and a bottom portion of the mold. For example, it is contemplated that the pressing station 140 uses a powered actuator (e.g., pneumatic, hydraulic, mechanically driven) to exert a desired amount of force on the mold to mate the portions of the mold prior to being exposed to the induction heating assemblies.

Figure 8:
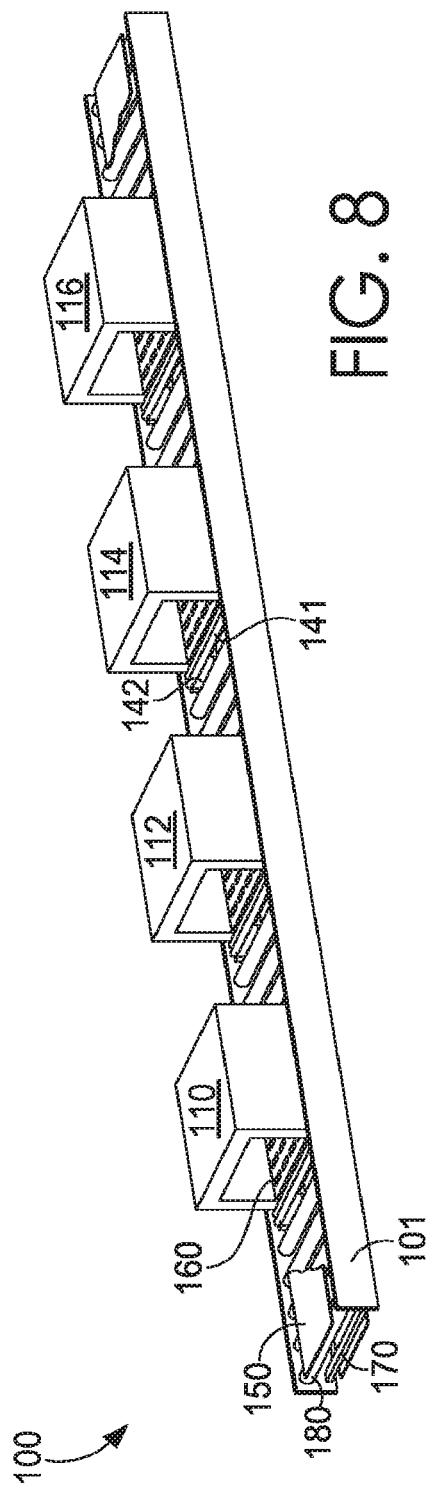
FIG. 8 illustrates a portion of an exemplary adjustable conveyance curing system with four induction heating assemblies in accordance with the present invention.
Figure 9:
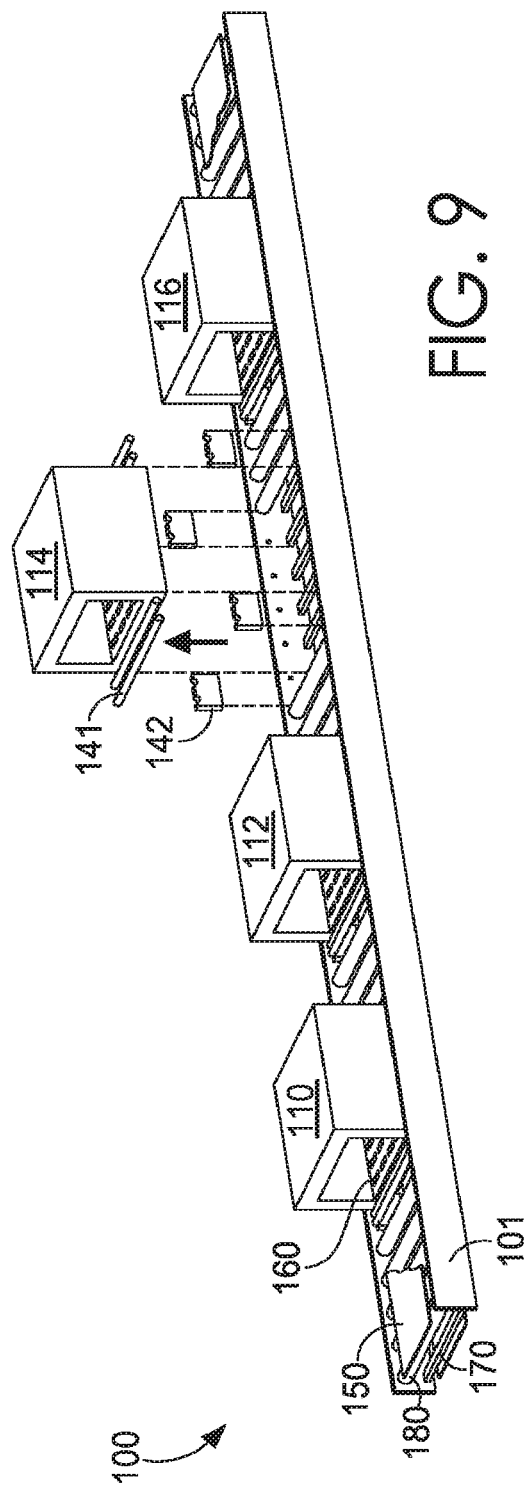
FIG. 9 illustrates a portion of an exemplary adjustable conveyance curing system having an induction heating assembly being removed from the adjustable conveyance curing system, in accordance with the present invention.

Aspects of the present invention allow a system to adjust a number of entities, such as induction heating assemblies 110, 112, 114, and 116 that are located within dynamic conveyance mechanism 101. In aspects of the present invention, an assembly may be moved, removed, or put into dynamic conveyance mechanism 101. FIGS. 8-11 illustrate a method of modifying a dynamic conveyance mechanism 101 within system 100. FIG. 8 illustrates a portion of system 100 that has four induction assemblies. FIG. 8 illustrates dynamic conveyance mechanism 101 having bars 170, removable rollers 180, temporary rollers 141, temporary roller holders 142, and belt 150. Within dynamic conveyance mechanism 101 are induction heating assemblies 110, 112, 114, and 116 where each induction heating assembly has chamber rollers 160. FIG. 9 illustrates induction heating assembly 114, temporary rollers 141, and temporary roller holders 142 that are removed from within dynamic conveyance mechanism 101. FIG. 10 illustrates removable rollers 180 being placed within dynamic conveyance mechanism 101 at a location from which induction heating assembly 114 was removed. FIG. 11 illustrates a final curing system 100 having three induction heating assemblies 110, 112, and 116.

Aspects of the present invention may allow a foam item within a mold to be cured and cooled with an automated, adjustable system, such as system 100. Utilizing aspects of the present invention, a foam item may be placed within a mold and a lid of the mold may be closed utilizing a pressing chamber. A mold having the foam item may be conveyed along a dynamic conveyance mechanism to one or more induction heating assemblies where the foam item may be cured through the introduction of heat by the induction heating assemblies heating the molds through induction heating. Each induction heating assembly may have induction coils having one or more coil patterns as described above. For instance, a first induction heating assembly may have a first coil pattern while a second induction heating assembly may have a second coil pattern. A mold containing the foam item heated to temperature of a first degree by a first induction heating assembly may be conveyed out of the first induction heating assembly into a soaking zone. While in the soaking zone, the temperature of the foam item may increase to a second degree (intermediate temperature). After reaching the temperature of the second degree, the mold containing the foam item may be conveyed into a second, third, fourth and more induction heating assemblies and/or soaking zones. After exiting a final induction heating assembly and/or soaking zone, the mold containing the foam item of a temperature of a specific degree may enter a cooling mechanism. While in the cooling mechanism, fluid jets and/or air jets may project fluid and/or air towards the mold causing the foam item to reach a temperature of a final degree.

Figure 12:
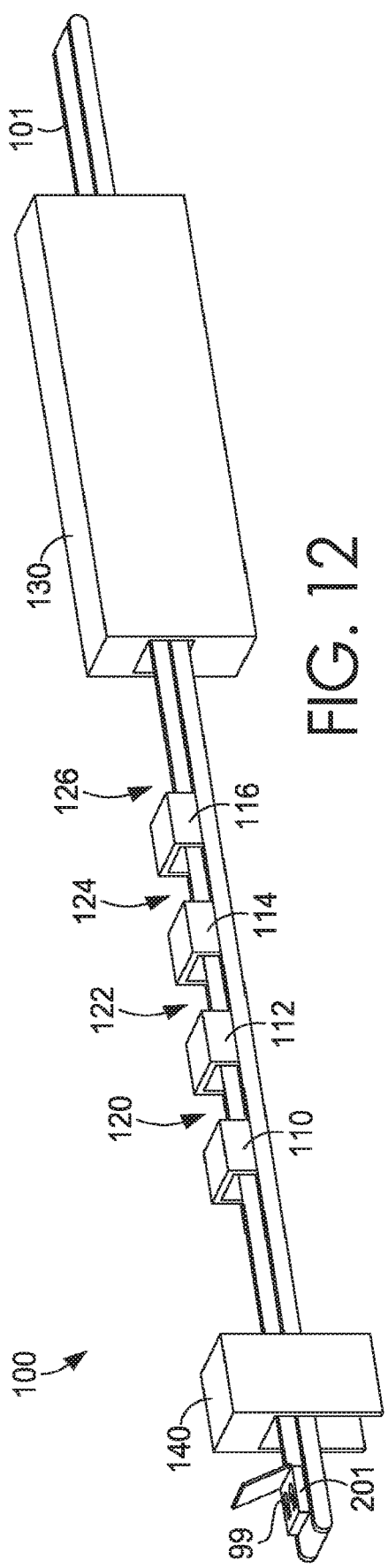
Figure 13:
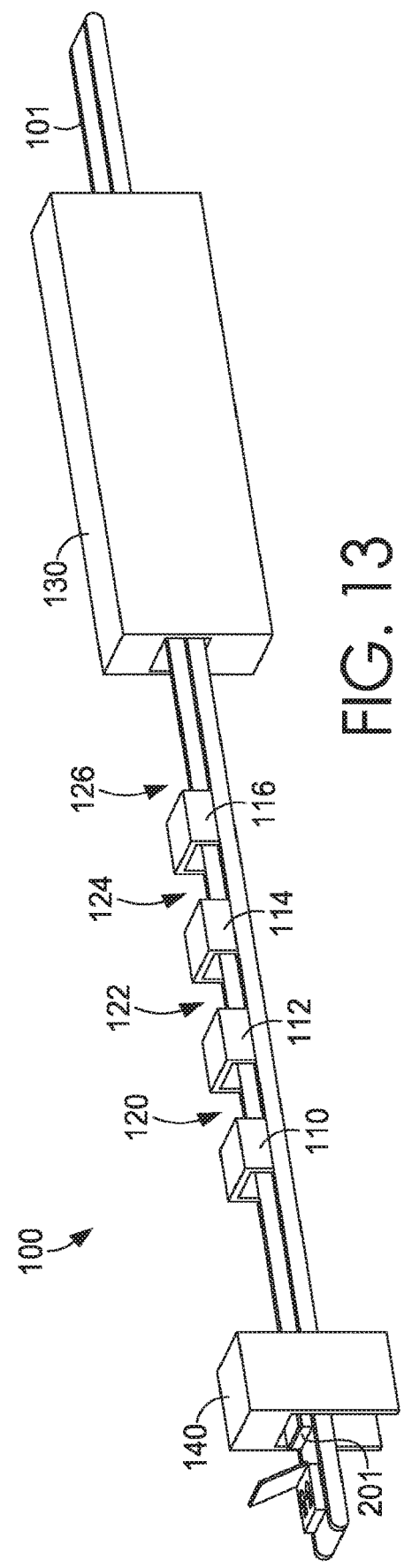

FIGS. 12-21 illustrate a method for curing a foam item using aspects of the present invention. FIG. 12 illustrates a mold 201 having one or more foam items 99 entering final curing system 100. The final curing system is comprised of the conveyance mechanism 101 extending along the pressing station 140; the induction heating assemblies 110, 112, 114, and 116; soaking zones 120, 122, 124, and 126; and the cooling mechanism 130, as illustrated in FIGS. 12-21 hereinafter. FIG. 13 illustrates mold 201 progressing along the conveyance mechanism 101 to the pressing chamber 140 where it is closed by pressing chamber 140. FIG. 14 illustrates a mold 201 having the foam item within a first induction heating assembly, induction heating assembly 110. While located in induction heating assembly 110, the mold 201 may be heated utilizing induction coils. It is contemplated that the induction heating assembly 110 is in an energized state because mold 201 is positioned therein.

The system 100 may use one or more sensors, such as vision system or positional detectors to cause the induction heating assemblies to energize or de-energize. However, it is contemplated that the induction heating assembly 110 remains energized regardless of the presence of the mold 201. The ability to pulse the applied energy (e.g., induction energy) to the mold provides efficiencies from an energy consumption perspective while also aiding in controlling the temperature achieved at the foam item and the timing that the foam item experiences a temperature zone. Further, as different molds having different heating needs are passed through a common system, the system can be dynamically adjusted to achieve a different (or similar) result for each mold. For example, it is contemplated that a smaller mold having a smaller foam item contained therein may pass through the same set of induction heating assemblies and soaking zones as a larger mold having a larger foam item therein. However, the induction heating assemblies may be energized in different manners (e.g., some may be energized for different lengths of time, some may not be energized at all) to achieve a proper temperature for the small mold as compared to the larger mold, all done within a common system. Stated differently, the systems provided herein are able to adapt to different inputs (e.g., molds, foam items) to achieve a consistent output (e.g., cured and formed foam item), in an exemplary aspect.

Figure 16:
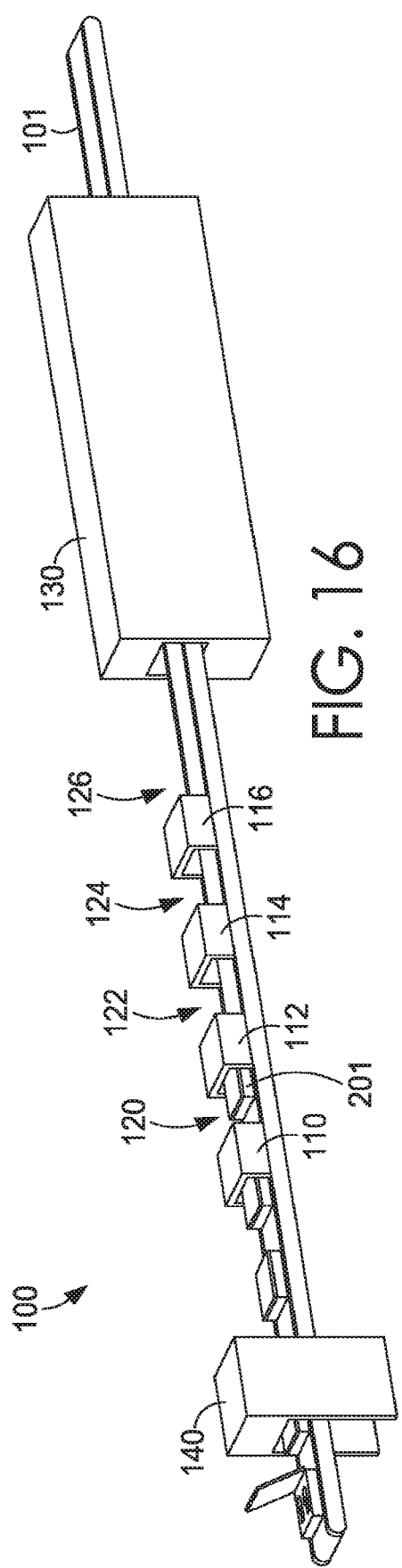
Figure 17:
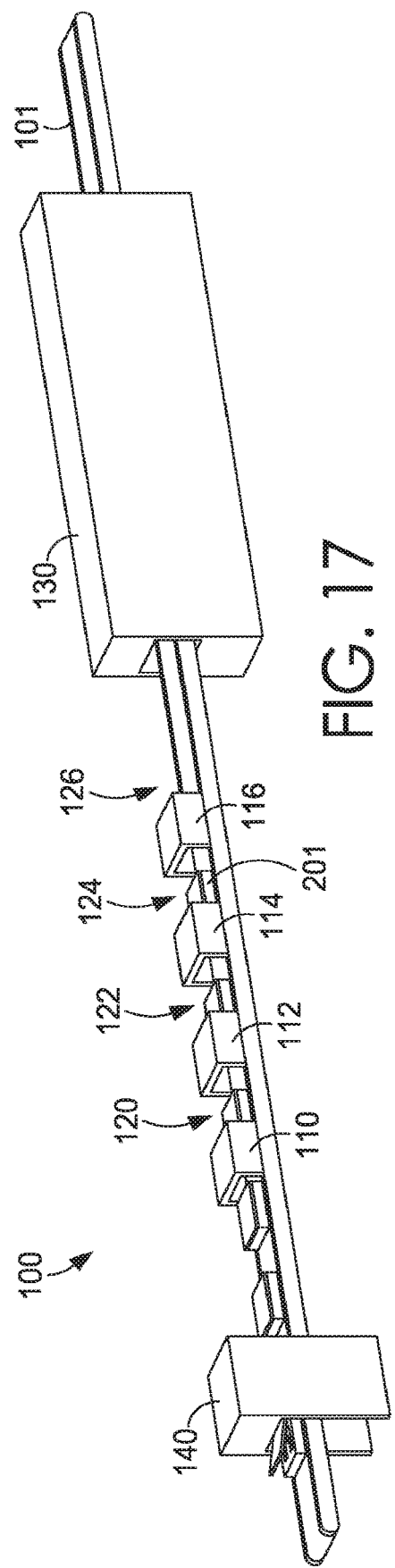
Figure 18:
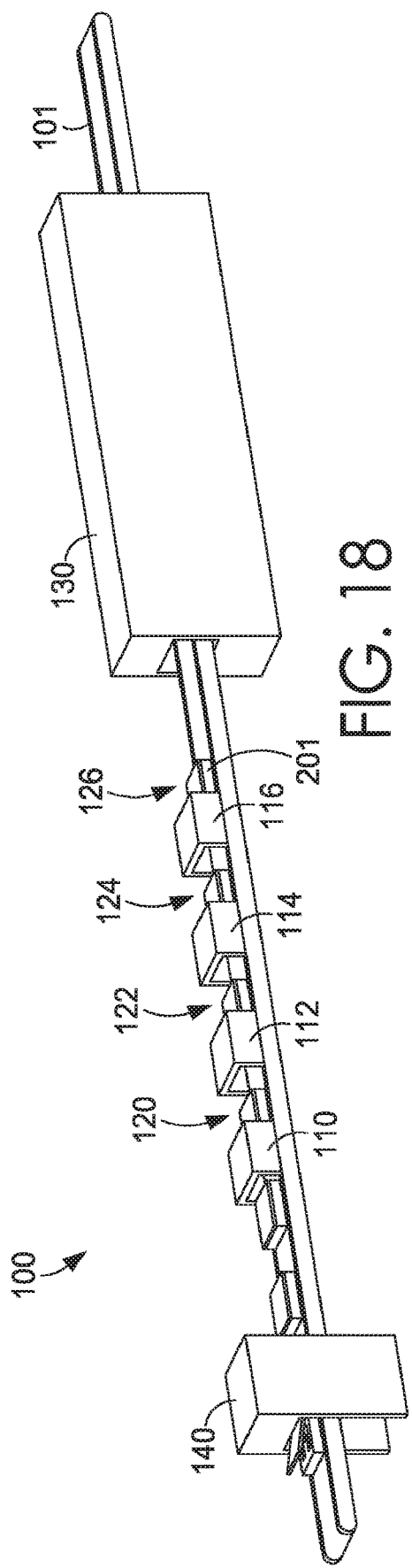
Figure 19:
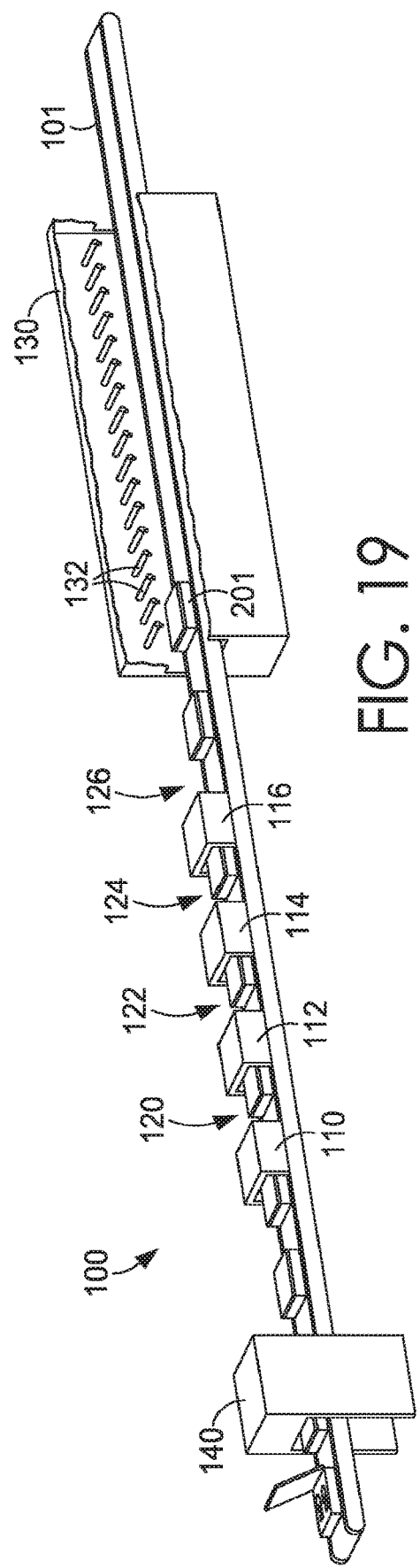

FIG. 15 illustrates a mold 201 having a foam item exiting induction heating assembly 110 and entering a first soaking zone, soaking zone 120, as the conveyance mechanism 101 moves the mold 201. As illustrated, it is contemplated that additional molds are placed on the conveyance mechanism 101 to form a continuous production line that is not dependent on a first mold to complete the entire system before a second mold may begin the process. FIG. 16 illustrates mold 201 entering a second induction heating assembly, induction heating assembly 112. FIG. 17 illustrates mold 201 exiting a third induction heating assembly, induction heating assembly 114, and entering a third soaking zone, soaking zone 124. FIG. 18 illustrates mold 201 exiting a fourth induction heating assembly, induction heating assembly 116, and entering a fourth soaking zone, soaking zone 126. FIG. 19 illustrates mold 201 near an entrance of cooling mechanism 130 having several fluid jets 132 and/or air jets. FIG. 20 illustrates mold 201 having a foam item near an exit of cooling mechanism 130. FIG. 21 illustrates mold 201 having exited cooling mechanism 130 where it may be opened and the foam item may be removed.

Figure 22:
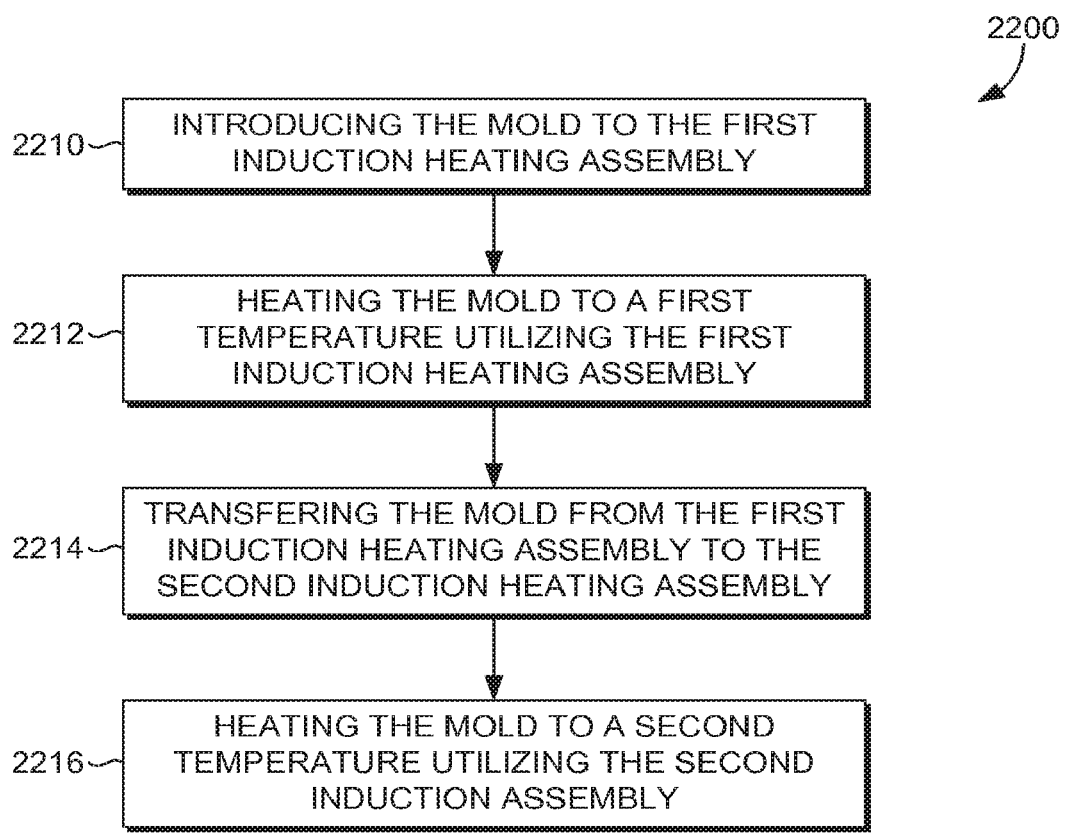
FIG. 22 illustrates an exemplary method for heating a moldable item in accordance with the present invention.

Turning now to FIG. 22, which illustrates a method 2200 for heating a mold containing a moldable item utilizing at least a first induction heating assembly and a second induction heating assembly. At step 2210, the mold is introduced to the first induction heating assembly. At step 2212, the mold is heated to a first temperature utilizing the first induction heating assembly. As previously discussed, the temperature may be at an exterior surface of the mold or an interior surface of the mold, such as a mold cavity surface proximate a foam item. At step 2214, the mold is transferred from the first induction heating assembly to the second induction heating assembly. At step 2216, the mold is heated to a second temperature utilizing the second induction heating assembly.

Figure 23:
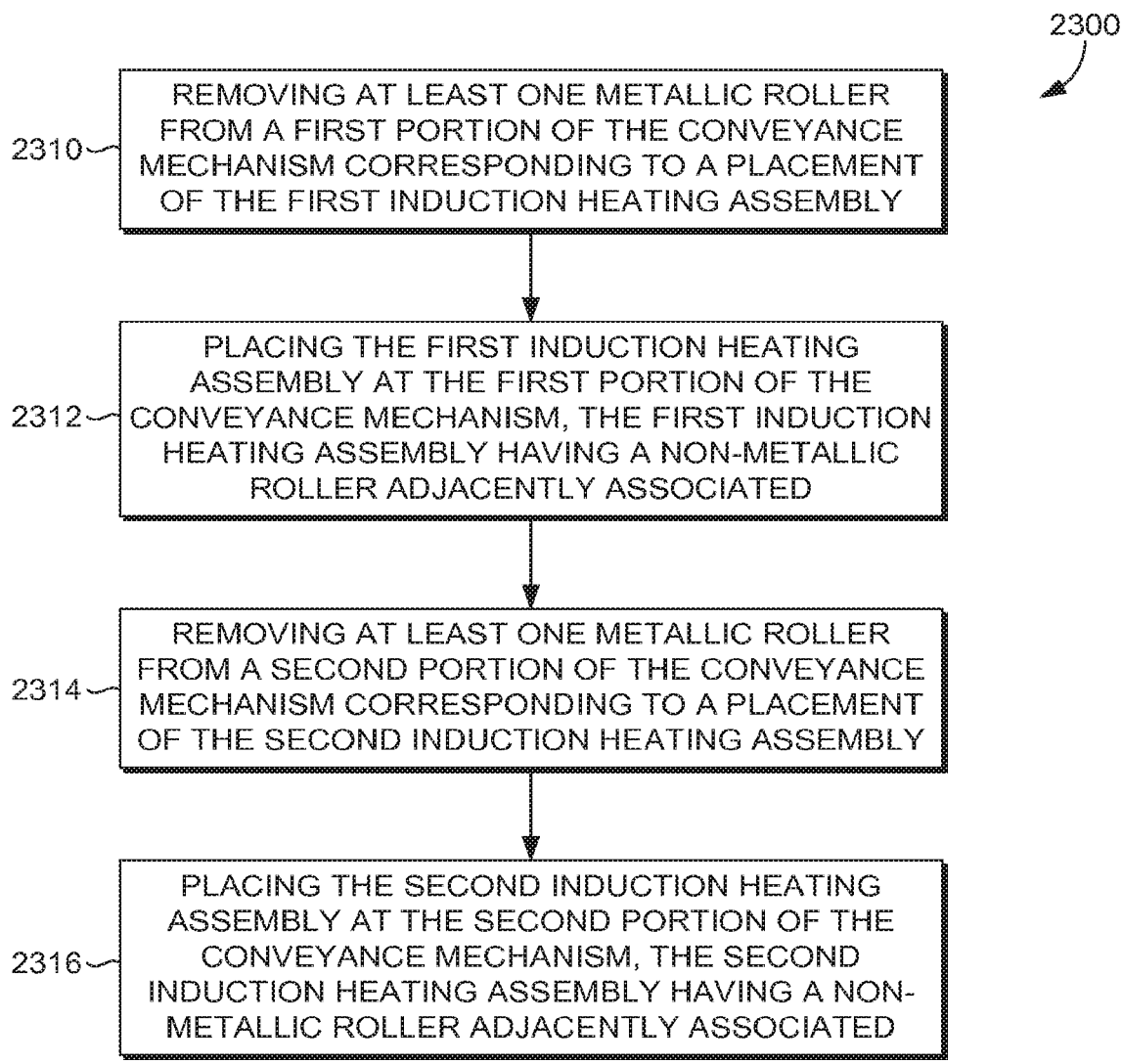
FIG. 23 illustrates an exemplary method for constructing a mold heating system in accordance with the present invention.

FIG. 23 illustrates a method 2300 of constructing a mold heating system including at least a first induction heating assembly, a second induction heating assembly, and a conveyance mechanism having a plurality of removable metallic rollers and a plurality of removable non-metallic rollers. At step 2310, at least one metallic roller from a first portion of the conveyance mechanism corresponding to a placement of the first induction heating assembly is removed. At step 2312, the first induction heating assembly is placed at the first portion of the conveyance mechanism. In some aspects, a non-metallic roller may be adjacently associated to the first induction heating assembly. At step 2314, at least one metallic roller is removed from a second portion of the conveyance mechanism that corresponds to a placement of the second induction heating assembly. At step 2316, the second induction heating assembly is placed at the second portion of the conveyance mechanism. In some aspects, a non-metallic roller may be adjacently associated to the second induction heating assembly.

Figure 24:
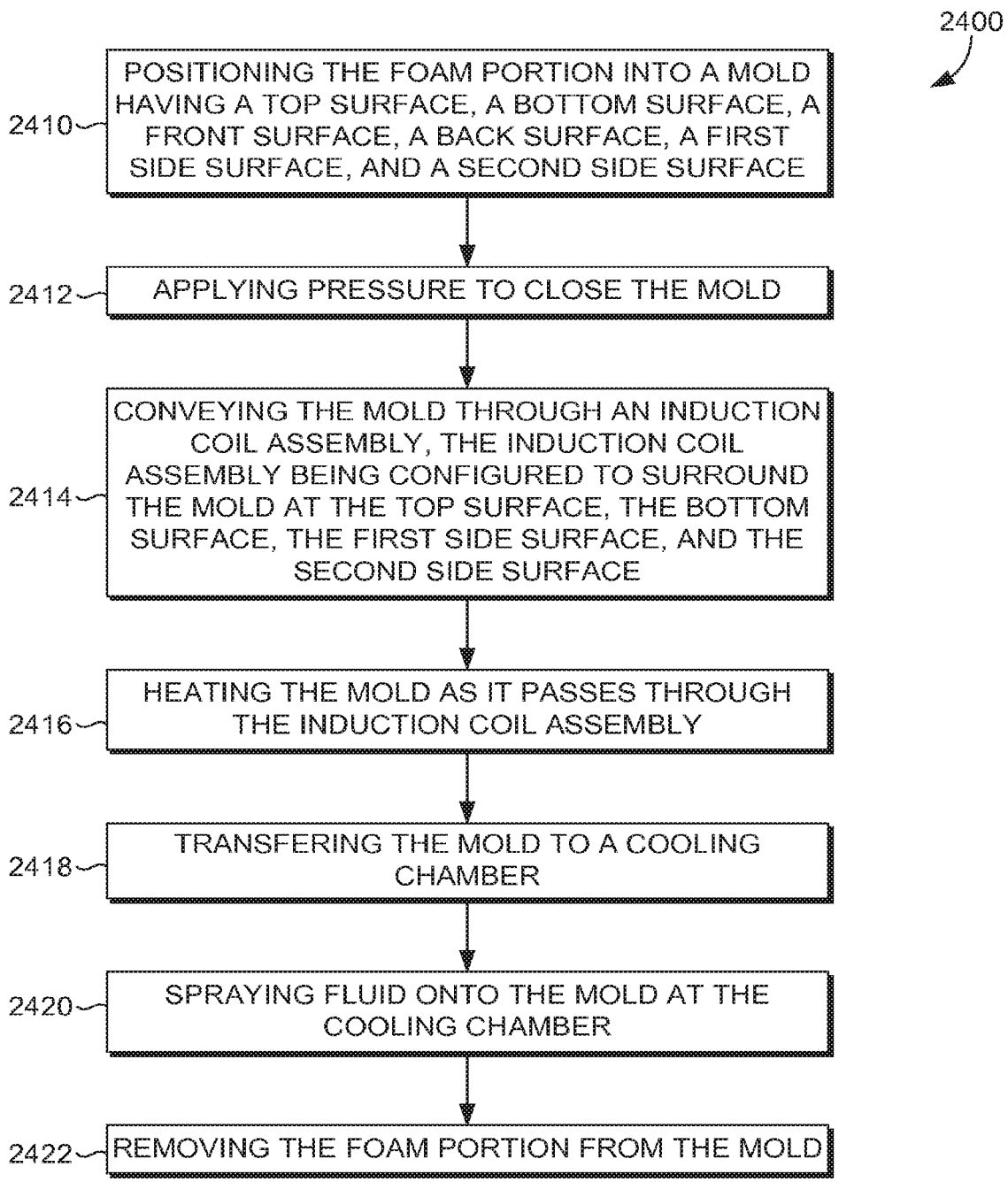
FIG. 24 illustrates a method for molding a foam portion in accordance with the present invention.

FIG. 24 illustrates a method 2400 for molding a foam portion of a footwear item. At step 2410, the foam portion may be positioned into a mold having a top surface, a bottom surface, a front surface, a back surface, a first side surface, and a second side surface. At step 2412, pressure may be applied to close the mold. At step 2416, the mold may be conveyed through an induction coil assembly. In some aspects, the induction coil assembly may be configured to surround the mold at the top surface, the bottom surface, the first side surface, and the second side surface. At step 2418, the mold may be heated as it passes through the induction coil assembly. At step 2420, the mold may be transferred into the cooling chamber. At step 2422, fluid may be sprayed onto the mold at the cooling chamber. At step 2424, the foam portion may be removed from the mold.

While systems and methods in accordance with the present invention have been described herein with regard to specific examples, it is contemplated that variations made to these examples fall within the scope of the present invention. For example, any number or orientation of induction heating assemblies may be used to cure a foam item. Multiple soaking zones may be employed at various locations along a dynamic conveyance mechanism. Various examples of components of systems in accordance with the present invention may be rearranged or omitted without departing from the scope of the present invention. Similarly, the methods in accordance with the present invention may be performed with steps in different orders than illustrated herein, and further some steps may be added or omitted without departing from the scope of the present invention.

What is claimed is:

1. A system for heating a mold containing a moldable item, the system comprising:
   a first removable induction heating assembly adapted to receive the mold;
   a second removable induction heating assembly adapted to receive the mold; and
   a conveyance mechanism supporting both the first removable induction heating assembly and the second removable induction heating assembly, the conveyance mechanism having:
      a first set of rollers, wherein at least one of the first set of rollers is removable from the conveyance mechanism,
      a belt supported at least partially by the first set of rollers, the belt passing at least partially through the first removable induction heating assembly and the second removable induction heating assembly such that the mold, when positioned on the belt, is configured to be conveyed between and at least partially through the first removable induction heating assembly and the second removable induction heating assembly,
      wherein the first removable induction heating assembly and the second removable induction heating assembly are configured to be flexibly located at numerous positions along the conveyance mechanism by selectively removing various rollers of the first set of rollers and replacing the various rollers with the first or second removable induction heating assembly.

2. The system of claim 1, wherein the first set of rollers are made of metallic materials.

3. The system of claim 1, wherein the conveyance mechanism further comprises a second set of rollers, wherein at least one roller of the second set of rollers is removable from the conveyance mechanism, the second set of rollers being made of non-metallic material, and wherein at least one of the second set of rollers is positioned adjacent to the first removable induction heating assembly and at least one of the second set of rollers is positioned adjacent to the second removable induction heating assembly, and wherein the first set of rollers are separated from the first and second removable induction assemblies by at least one of the second set of rollers.

4. The system of claim 1, wherein the belt is made of a non-metallic material.

5. The system of claim 1, wherein the conveyance mechanism further including a set of support bars, the set of support bars being configured to support the first removable induction heating assembly and the second removable induction heating assembly.

6. The system of claim 1, wherein at least one of the first removable induction heating assembly or the second removable induction heating assembly has an induction coil that at least partially surrounds the mold when the mold is received in the at least one of the first or second removable induction assembly.

* * * * *